(12) United States Patent
Zhou et al.

(10) Patent No.: US 12,301,405 B2
(45) Date of Patent: May 13, 2025

(54) ALARM PROCESSING METHOD AND APPARATUS, DEVICE, AND READABLE STORAGE MEDIUM

(71) Applicant: HUAWEI TECHNOLOGIES CO., LTD., Guangdong (CN)

(72) Inventors: Min Zhou, Shenzhen (CN); Ganghuan He, Shenzhen (CN); Philippe Fournier Viger, Shenzhen (CN); Xi Zhang, Dongguan (CN); Ganyu Lu, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/334,090

(22) Filed: Jun. 13, 2023

(65) Prior Publication Data

US 2023/0327941 A1   Oct. 12, 2023

Related U.S. Application Data

(63) Continuation of application No. PCT/CN2021/129316, filed on Nov. 8, 2021.

(30) Foreign Application Priority Data

Dec. 14, 2020  (CN) .......................... 202011468699.6

(51) Int. Cl.
*H04L 41/0631* (2022.01)
*H04L 41/0604* (2022.01)
(Continued)

(52) U.S. Cl.
CPC ........ *H04L 41/065* (2013.01); *H04L 41/0604* (2013.01); *H04L 41/0618* (2013.01);
(Continued)

(58) Field of Classification Search
CPC ............. H04L 41/0604; H04L 41/0618; H04L 41/0631; H04L 41/065; H04L 41/069; H04L 41/082; H04L 41/12; H04L 41/28
See application file for complete search history.

(56) References Cited

U.S. PATENT DOCUMENTS 9,838,244 B1 * 12/2017 Lawrence ............. H04L 41/065
10,521,324 B2 * 12/2019 Whitner ............... G06F 11/3495
(Continued)

FOREIGN PATENT DOCUMENTS

CN          1121384 A       4/1996
CN          107181604 A     9/2017
(Continued)

OTHER PUBLICATIONS

Li et al., "Complex Attack Linkage Decision-Making in Edge Computing Networks," IEEE Access, vol. 7, Feb. 4, 2019, pp. 12058-12072.
(Continued)

*Primary Examiner* — Thomas J Dailey
(74) *Attorney, Agent, or Firm* — Fish & Richardson P.C.

(57) ABSTRACT

This application discloses an alarm processing method and apparatus, a device, and a readable storage medium. An example method includes generating an alarm attribute graph based on alarm records in a target network and topology data of the target network. The alarm attribute graph includes identifiers of a plurality of devices, a communication connection relationship between the plurality of devices, type information of the plurality of devices, and alarm attribute information of the plurality of devices. The alarm attribute information of each device includes a name of an alarm occurring in the device and a time point at which each alarm occurs in the device.

26 Claims, 10 Drawing Sheets

(51) Int. Cl.
*H04L 41/069* (2022.01)
*H04L 41/082* (2022.01)
*H04L 41/12* (2022.01)
*H04L 41/28* (2022.01)

(52) U.S. Cl.
CPC ........ *H04L 41/0631* (2013.01); *H04L 41/069* (2013.01); *H04L 41/082* (2013.01); *H04L 41/12* (2013.01); *H04L 41/28* (2013.01)

(56) References Cited

U.S. PATENT DOCUMENTS

| | | | |
|---|---|---|---|
| 10,637,737 B2* | 4/2020 | Whitner | H04L 41/12 |
| 2016/0218911 A1* | 7/2016 | Wessels | H04L 43/045 |
| 2016/0371327 A1* | 12/2016 | Hoernicke | G06F 16/245 |
| 2018/0217879 A1* | 8/2018 | Garcia | G06F 11/0709 |
| 2019/0165989 A1* | 5/2019 | Jacobs | G05B 23/0235 |
| 2021/0028973 A1* | 1/2021 | Côté | H04J 3/1652 |
| 2021/0099336 A1* | 4/2021 | Li | H04L 41/0636 |

FOREIGN PATENT DOCUMENTS

| | | |
|---|---|---|
| CN | 108243058 A | 7/2018 |
| CN | 109684181 A | 4/2019 |
| CN | 109951306 A | 6/2019 |
| CN | 110399347 A | 11/2019 |
| CN | 110493042 A | 11/2019 |
| CN | 110995482 A | 4/2020 |
| CN | 112583644 A | 3/2021 |
| WO | 2019104296 A1 | 5/2019 |

OTHER PUBLICATIONS

Extended European Search Report in European Appln No. 21905364.2, dated Apr. 23, 2024, 13 pages.
International Search Report and Written Opinion in International Appln. No. PCT/CN2021/129316, mailed on Jan. 30, 2022, 19 pages (with English translation).

* cited by examiner

ALARM PROCESSING METHOD AND APPARATUS, DEVICE, AND READABLE STORAGE MEDIUM

CROSS-REFERENCE TO RELATED APPLICATIONS

This application is a continuation of International Application No. PCT/CN2021/129316, filed on Nov. 8, 2021, which claims priority to Chinese Patent Application No. 202011468699.6, filed on Dec. 14, 2020. The disclosures of the aforementioned applications are hereby incorporated by reference in their entireties.

TECHNICAL FIELD

Embodiments of this application relate to the field of communications technologies, and in particular, to an alarm processing method and apparatus, a device, and a readable storage medium.

BACKGROUND

With the development of communications technologies, a communication network plays an increasingly important role in people's life. Currently, communication services are increasingly diversified. Therefore, a quantity of network devices and types of the network devices in the communication network are increasing, and a connection relationship between the network devices is becoming increasingly complex. A large quantity of faults (Fault) may occur on the complex communication network every day. As a result, millions of alarms (Alarm) are generated.

To process all the generated alarms, a worker needs to check a large quantity of devices, which undoubtedly brings a heavy workload to the worker. Actually, the alarms usually include redundant alarms, and there is usually a degree of association between the alarms. Therefore, to reduce the workload of the worker, the redundant alarms are removed first, and the degree of association between the alarms is determined. Then, the generated alarms are screened based on the degree of association, and finally alarms obtained after the redundant alarms are removed and the screening is performed are processed.

Therefore, a method that can generate a comprehensive degree of association between alarms is required to filter out redundant alarms as much as possible.

SUMMARY

Embodiments of this application provide an alarm processing method and apparatus, a device, and a readable storage medium, so as to generate a comprehensive degree of association between alarms.

A first aspect of embodiments of this application provides an alarm processing method, where the method may be applied to a network hub responsible for processing an alarm record, and includes:
obtaining a plurality of alarm records of a target network, where the target network includes a plurality of devices, and each alarm record includes an alarm name, an alarm occurrence time point, and an identifier of a device in which an alarm occurs, where the alarm name may also be referred to as an alarm type, and the identifier of the device in which the alarm occurs may be in a plurality of forms, for example, may be a number; obtaining topology data of the target network, specifically, obtaining topology data of the target network based on a device path log of the target network, where the topology data includes type information of the plurality of devices and a communication connection relationship between the plurality of devices; the communication connection relationship includes a direct communication connection and an indirect communication connection; and the direct communication connection may be understood as that two devices may directly communicate with each other, and the indirect communication connection may be understood as that two devices need to communicate with each other by using at least one intermediate device; generating an alarm attribute graph based on the plurality of alarm records and the topology data, where the alarm attribute graph includes identifiers of the plurality of devices, the communication connection relationship between the plurality of devices, the types of the plurality of devices, and alarm attribute information of the plurality of devices, and the alarm attribute information of each device includes a name of an alarm occurring in the device and an occurrence time point of each alarm in the device; and obtaining a degree of association between alarms based on the alarm attribute graph, where the degree of association may be represented in a form of alarm X→alarm Y, where the alarm X is a predecessor of the degree of association, and the alarm Y is a successor of the degree of association, that is, may be considered as a possibility that the alarm X causes the alarm Y.

The alarm attribute graph is generated based on the plurality of alarm records and the topology data of the target network. The alarm attribute graph includes not only the type of each device, the name of the alarm occurring in each device, and the time point at which the alarm with each name occurs in each device, but also the communication connection relationship between the devices. Therefore, the degree of association between the alarms in a plurality of cases can be generated based on the alarm attribute graph, so that the obtained degree of association between the alarms is more comprehensive, thereby improving an alarm record screening effect, increasing an alarm record compression ratio, and reducing a quantity of alarms obtained after screening, to further reduce a quantity of generated work orders and reduce workload of a worker.

In an implementation, after the generating a degree of association between alarms, the method further includes: filtering out redundant alarms based on the degree of association between the alarms.

The filtering out redundant alarms based on the degree of association between the alarms can reduce the quantity of alarms, thereby reducing the quantity of generated work orders and reducing the workload of the worker.

In an implementation, the generating a degree of association between alarms based on the alarm attribute graph includes: determining at least one group of devices based on the alarm attribute graph, specifically, determining at least one group of devices based on the communication connection relationship between the plurality of devices and the types of the plurality of devices, where each group of devices in the at least one group of devices includes at least one device and satisfies a first target condition; and determining, based on the alarm attribute information of each device in the at least one group of devices, a degree of association between two alarms that occur in one group of devices satisfying the first target condition.

In this implementation, at least one group of devices satisfying a condition is determined based on the communication connection relationship between the plurality of devices and the types of the plurality of devices, and then a degree of association between alarms that occur in a group of devices satisfying the condition is determined. The degree of association between the alarms determined in this manner is applicable to the group of devices satisfying the condition. Therefore, an accuracy ratio of the degree of association between the alarms is better.

In an implementation, the first target condition includes: each group of devices includes one device and a type of the device in each group of devices is a first type, where the first type may be any type of the device.

This implementation provides a single-device scenario, that is, may determine a degree of association between two alarms that occur in a single device.

In an implementation, the first target condition includes: each group of devices includes two devices, types of the two devices in each group of devices are both a first type, and the two devices in each group of devices are in communication connection, where the first type may be any type of the devices; and the degree of association is a degree of association between an alarm that occurs in one device and an alarm that occurs in the other device in a group of devices satisfying the first target condition.

Specifically, two devices in each group of devices may be in a communication connection by using a same quantity of devices. For example, two devices in each group of devices are in a direct communication connection. For another example, two devices in each group of devices are in an indirect communication connection. Specifically, two devices in each group of devices are in a communication connection by using one device, or two devices in each group of devices are in a communication connection by using two devices, and the rest can be deduced by analogy.

This implementation provides a cross-device scenario, that is, may determine a degree of association between an alarm that occurs in one device and an alarm that occurs in the other device in the cross-device scenario.

In an implementation, the first target condition includes: each group of devices includes two devices, types of the two devices in each group of devices are a first type and a second type respectively, and the two devices in each group of devices are in communication connection; and the degree of association is a degree of association between an alarm that occurs in a device of the first type and an alarm that occurs in a device of the second type in a group of devices satisfying the first target condition. In the group of devices satisfying the first target condition, a name of the alarm that occurs in the device of the first type may be the same as or different from a name of the alarm that occurs in the device of the second type.

Because devices of different types belong to different domains, this implementation provides a cross-domain scenario, that is, may determine the degree of association between the alarm that occurs in the device of the first type and the alarm that occurs in the device of the second type in the group of devices satisfying the first target condition.

In an implementation, the determining, based on the alarm attribute information of each device in the at least one group of devices, a degree of association between two alarms that occur in one group of devices satisfying the first target condition includes: determining, based on the alarm attribute information of each device in the at least one group of devices, a quantity of times that an alarm with a first name occurs, a quantity of times that an alarm with a second name occurs, and a quantity of times that the alarm with the first name and the alarm with the second name occur collaboratively in each group of devices, and determining that a collaborative occurrence rule is that a time point at which the alarm with the first name occurs and a time point at which the alarm with the second name occurs satisfy a second target condition; and determining, based on the quantity of times that the alarm with the first name occurs, the quantity of times that the alarm with the second name occurs, and the quantity of times that the alarm with the first name and the alarm with the second name occur collaboratively in each group of devices, a degree of association between the alarm with the first name and the alarm with the second name that occur in a group of devices satisfying the first target condition.

This implementation provides a feasible solution for determining a degree of association between alarms.

In an implementation, the second target condition includes: an absolute value of a difference between an occurrence time point of the alarm with the first name and an occurrence time point of the alarm with the second name is less than preset duration, where the preset duration may be set based on manual experience.

For example, the alarm with the first name and the alarm with the second name are generated by one device, the alarm with the first name is an alarm A, and the alarm with the second name is an alarm B. The alarm A occurs at a time point t1 and a time point t2 separately, and the alarm B occurs at a time point t3 and a time point t4 separately. If a difference between the time point t2 at which the alarm B occurs and the time point t1 at which the alarm A occurs is less than the preset duration, it indicates that the alarm A and the alarm B occur collaboratively once. On this basis, if a difference between the time point t4 at which the alarm B occurs and the time point t3 at which the alarm A occurs is less than the preset duration, it indicates that the alarm A and the alarm B occur collaboratively twice.

This implementation provides a specific example of the second target condition.

In an implementation, the determining, based on the quantity of times that the alarm with the first name occurs, the quantity of times that the alarm with the second name occurs, and the quantity of times that the alarm with the first name and the alarm with the second name occur collaboratively in each group of devices, a degree of association between the alarm with the first name and the alarm with the second name that occur in a group of devices satisfying the first target condition includes: determining, based on the quantity of times that the alarm with the first name occurs, the quantity of times that the alarm with the second name occurs, and the quantity of times that the alarm with the first name and the alarm with the second name occur collaboratively in each group of devices, a total quantity of times that the alarm with the first name occurs, a total quantity of times that the alarm with the second name occurs, and a total quantity of times that the alarm with the first name and the alarm with the second name occur collaboratively in the at least one group of devices; and determining, based on the total quantity of times that the alarm with the first name occurs, the total quantity of times that the alarm with the second name occurs, the total quantity of times that the alarm with the first name and the alarm with the second name occur collaboratively, and a target formula, a degree of association between the alarm with the first name and the alarm with the second name that occur in a group of devices satisfying the first target condition, where the degree of association indicates a possibility that the alarm with the first name causes the alarm with the second name or a possibility that the alarm with the second name causes the alarm with the first name; and the target formula is an asymmetric measurement formula, where the asymmetric measurement formula may be understood as each formula that can measure a difference between the possibility that the alarm with the first name causes the alarm with the second name and the possibility that the alarm with the second name causes the alarm with the first name.

Because the target formula is an asymmetric measurement formula, the target formula can reflect relative degrees of importance of the alarm with the first name and the alarm with the second name.

In an implementation, the degree of association indicates the possibility that the alarm with the first name causes the alarm with the second name; and the target formula includes:

$$P_{A\,to\,B} = \frac{n_{AB}/n_A}{Y - n_{AB}/n_B},$$

where $P_{AtoB}$ represents the possibility that the alarm with the first name causes the alarm with the second name, Y is a constant greater than or equal to 2, $n_A$ represents the total quantity of times that the alarm with the first name occurs, $n_B$ represents the total quantity of times that the alarm with the second name occurs, and $n_{AB}$ represents the total quantity of times that the alarm with the first name and the alarm with the second name occur collaboratively.

This implementation provides a specific example of the target formula. The formula not only can reflect relative degrees of importance of the alarm with the first name and the alarm with the second name, but also can reflect importance of an alarm that occurs for a small quantity of times.

In an implementation, the obtaining topology data of the target network includes: obtaining the topology data of the target network based on a device path log of the target network, where the device path log includes data of at least one communication path, the at least one communication path includes the plurality of devices, each communication path includes a plurality of devices in communication connection, and data of each communication path includes identifiers of the plurality of devices in the communication connection and type information of the plurality of devices in the communication connection. In addition, the data of each communication path may further include a number of the communication path and numbers of the devices on the communication path.

This implementation provides a specific implementation of obtaining topology data, that is, generating topology data based on a device path log, so that a manner of generating topology data is more flexible.

In an implementation, there are a plurality of degrees of association between the alarms, and each degree of association indicates a possibility that an alarm with a name causes an alarm with another name; and after the obtaining a degree of association between alarms based on the alarm attribute graph, the method further includes: screening the plurality of degrees of association to select at least one degree of association that is greater than a target threshold.

In this implementation, the plurality of generated degrees of association are screened by using the target threshold, and then a real-time alarm stream is screened by using a degree of association obtained after the screening, so as to avoid a case that some important alarms that can reflect a fault are filtered out because the real-time alarm stream is screened by using a degree of association with a low possibility.

In an implementation, after the obtaining a degree of association between alarms based on the alarm attribute graph, and before the screening the plurality of degrees of association to select at least one degree of association whose possibility is greater than a threshold, the method further includes: determining, based on the plurality of degrees of association between the alarms, a quantity of degrees of association that are within each of a plurality of threshold ranges; and determining the target threshold based on the quantity of degrees of association between alarms within each threshold range. Specifically, the target threshold may be determined based on an elbow rule and the quantity of degrees of association between alarms within each threshold range.

Compared with manually determining the target threshold, this implementation determines the target threshold based on the quantity of degrees of association between alarms within each threshold range, so that the determined target threshold is more accurate, and efficiency of determining the target threshold can be improved.

In an implementation, the obtaining a plurality of alarm records of a target network includes: obtaining a plurality of alarm records generated by the target network in a target time segment, where the target time segment may be set based on an actual requirement.

In an implementation, the target time segment is one month. In addition, the target time segment may be 7 days, 10 days, 20 days, 25 days, 35 days, 40 days, or the like.

A second aspect of embodiments of this application provides an alarm processing apparatus, including: an obtaining unit, an alarm attribute graph generation unit, and a degree of association generation unit. The obtaining unit is configured to obtain a plurality of alarm records of a target network, where the target network includes a plurality of devices, and each alarm record includes an alarm name, an alarm occurrence time point, and an identifier of a device in which an alarm occurs. The obtaining unit is further configured to obtain topology data of the target network, where the topology data includes type information of the plurality of devices and a communication connection relationship between the plurality of devices. The alarm attribute graph generation unit is configured to generate an alarm attribute graph based on the plurality of alarm records and the topology data, where the alarm attribute graph includes identifiers of the plurality of devices, the communication connection relationship between the plurality of devices, the type information of the plurality of devices, and alarm attribute information of the plurality of devices, and the alarm attribute information of each device includes a name of an alarm occurring in the device and an occurrence time point of each alarm in the device. The degree of association generation unit is configured to obtain a degree of association between alarms based on the alarm attribute graph.

In an implementation, the alarm processing apparatus further includes: a filtering unit, configured to filter out redundant alarms based on the degree of association between the alarms.

In an implementation, the degree of association generation unit is configured to: determine at least one group of devices based on the alarm attribute graph, where each group of devices in the at least one group of devices includes at least one device and satisfies a first target condition; and determine, based on the alarm attribute information of each device in the at least one group of devices, a degree of association between two alarms that occur in one group of devices satisfying the first target condition.

In an implementation, the first target condition includes: each group of devices includes one device and a type of the device in each group of devices is a first type.

In an implementation, the first target condition includes: each group of devices includes two devices, types of the two devices in each group of devices are both a first type, and the two devices in each group of devices are in communication connection; and the degree of association is a degree of association between an alarm that occurs in one device and an alarm that occurs in the other device in a group of devices satisfying the first target condition.

In an implementation, the first target condition includes: each group of devices includes two devices, types of the two devices in each group of devices are a first type and a second type respectively, and the two devices in each group of devices are in communication connection; and the degree of association is a degree of association between an alarm that occurs in a device of the first type and an alarm that occurs in a device of the second type in a group of devices satisfying the first target condition.

In an implementation, the degree of association generation unit is configured to: determine, based on the alarm attribute information of each device in the at least one group of devices, a quantity of times that an alarm with a first name occurs, a quantity of times that an alarm with a second name occurs, and a quantity of times that the alarm with the first name and the alarm with the second name occur collaboratively in each group of devices, and determine that a collaborative occurrence rule is that a time point at which the alarm with the first name occurs and a time point at which the alarm with the second name occurs satisfy a second target condition; and determine, based on the quantity of times that the alarm with the first name occurs, the quantity of times that the alarm with the second name occurs, and the quantity of times that the alarm with the first name and the alarm with the second name occur collaboratively in each group of devices, a degree of association between the alarm with the first name and the alarm with the second name that occur in a group of devices satisfying the first target condition.

In an implementation, the second target condition includes: an absolute value of a difference between an occurrence time point of the alarm with the first name and an occurrence time point of the alarm with the second name is less than preset duration.

In an implementation, the degree of association generation unit is configured to: determine, based on the quantity of times that the alarm with the first name occurs, the quantity of times that the alarm with the second name occurs, and the quantity of times that the alarm with the first name and the alarm with the second name occur collaboratively in each group of devices, a total quantity of times that the alarm with the first name occurs, a total quantity of times that the alarm with the second name occurs, and a total quantity of times that the alarm with the first name and the alarm with the second name occur collaboratively in the at least one group of devices; and determine, based on the total quantity of times that the alarm with the first name occurs, the total quantity of times that the alarm with the second name occurs, the total quantity of times that the alarm with the first name and the alarm with the second name occur collaboratively, and a target formula, a degree of association between the alarm with the first name and the alarm with the second name that occur in a group of devices satisfying the first target condition, where the degree of association indicates a possibility that the alarm with the first name causes the alarm with the second name or a possibility that the alarm with the second name causes the alarm with the first name; and the target formula is an asymmetric measurement formula.

In an implementation, the degree of association indicates the possibility that the alarm with the first name causes the alarm with the second name; and the target formula includes:

$$P_{A\,to\,B} = \frac{n_{AB}/n_A}{Y - n_{AB}/n_B},$$

where $P_{AtoB}$ represents the possibility that the alarm with the first name causes the alarm with the second name, Y is a constant greater than or equal to 2, $n_A$ represents the total quantity of times that the alarm with the first name occurs, $n_B$ represents the total quantity of times that the alarm with the second name occurs, and $n_{AB}$ represents the total quantity of times that the alarm with the first name and the alarm with the second name occur collaboratively.

In an implementation, the obtaining unit is configured to obtain the topology data of the target network based on a device path log of the target network, where the device path log includes data of at least one communication path, the at least one communication path includes the plurality of devices, each communication path includes a plurality of devices in communication connection, and data of each communication path includes identifiers of the plurality of devices in the communication connection and type information of the plurality of devices in the communication connection.

In an implementation, there are a plurality of degrees of association between the alarms, and each degree of association indicates a possibility that an alarm with a name causes an alarm with another name; and the alarm processing apparatus further includes: a degree of association screening unit, configured to screen the plurality of degrees of association to select at least one degree of association that is greater than a target threshold.

In an implementation, the degree of association screening unit is configured to: determine, based on the plurality of degrees of association between the alarms, a quantity of degrees of association that are within each of a plurality of threshold ranges; and determine the target threshold based on the quantity of degrees of association between alarms within each threshold range.

In an implementation, the obtaining unit is configured to obtain a plurality of alarm records generated by the target network in a target time segment.

In an implementation, the target time segment is one month.

For specific implementations, related descriptions, and technical effects of the foregoing units, refer to descriptions in the first aspect of embodiments of this application.

A third aspect of embodiments of this application provides a computer device, including: one or more processors and a memory, where the memory stores computer-readable instructions; and the one or more processors read the computer-readable instructions, to enable the computer device to implement the method according to any implementation of the first aspect.

A fourth aspect of embodiments of this application provides a computer-readable storage medium, including computer-readable instructions, where when the computer-readable instructions are run on a computer, the computer is enabled to perform the method according to any implementation of the first aspect.

A fifth aspect of embodiments of this application provides a chip, including one or more processors. Some or all of the processors is configured to read and execute a computer program stored in a memory, to perform the method in any possible implementation of the first aspect.

Optionally, the chip includes the memory, and the memory and the processor are connected to the memory by using a circuit or a wire. Further optionally, the chip further includes a communication interface, and the processor is connected to the communication interface. The communication interface is configured to receive data and/or information that needs to be processed. The processor obtains the data and/or information from the communication interface, processes the data and/or information, and outputs a processing result through the communication interface. The communication interface may be an input/output interface.

In some implementations, some of the one or more processors may implement some steps in the foregoing method by using dedicated hardware. For example, processing related to a neural network model may be implemented by a dedicated neural network processor or graphics processing unit.

The method provided in embodiments of this application may be implemented by one chip, or may be collaboratively implemented by a plurality of chips.

A sixth aspect of embodiments of this application provides a computer program product. The computer program product includes computer software instructions, and the computer software instructions may be loaded by a processor to implement the method according to any implementation of the first aspect.

It can be learned from the foregoing technical solutions that embodiments of this application have the following advantages:

The alarm attribute graph is generated based on the plurality of alarm records and the topology data of the target network. The alarm attribute graph includes not only the type information of each device, the name of the alarm occurring in each device, and the time point at which each alarm occurs in each device, but also the communication connection relationship between the devices. Therefore, the degree of association between the alarms in a plurality of cases can be generated based on the alarm attribute graph, so that the generated degree of association between the alarms is more comprehensive, thereby improving an alarm record screening effect, increasing an alarm record compression ratio, and reducing a quantity of alarms obtained after screening, to further reduce a quantity of generated work orders and reduce workload of a worker.

DESCRIPTION OF EMBODIMENTS

The following describes embodiments of this application with reference to accompanying drawings. It is clear that the described embodiments are merely some but not all embodiments of this application. A person of ordinary skill in the art may learn that, with technology development and emergence of a new scenario, the technical solutions provided in embodiments of this application are also applicable to a similar technical problem.

In the specification, claims, and accompanying drawings of this application, the terms "first", "second", and so on are intended to distinguish between similar objects but do not necessarily indicate a specific order or sequence. It should be understood that the data used in such a way are interchangeable in appropriate circumstances, so that embodiments described herein can be implemented in an order other than the content illustrated or described herein. Moreover, terms "include", "have", and any other variant thereof are intended to cover non-exclusive inclusion. For example, a process, a method, a system, a product, or a device that includes a series of steps or modules is not necessarily limited to those expressly listed steps or modules, but may include other steps or modules not expressly listed or inherent to the process, the method, the product, or the device. Names or numbers of steps in this application do not mean that the steps in the method procedure need to be performed in a time/logical sequence indicated by the names or numbers.

An execution sequence of the steps in the procedure that have been named or numbered can be changed based on a technical objective to be achieved, provided that same or similar technical effects can be achieved.

Figure 1:
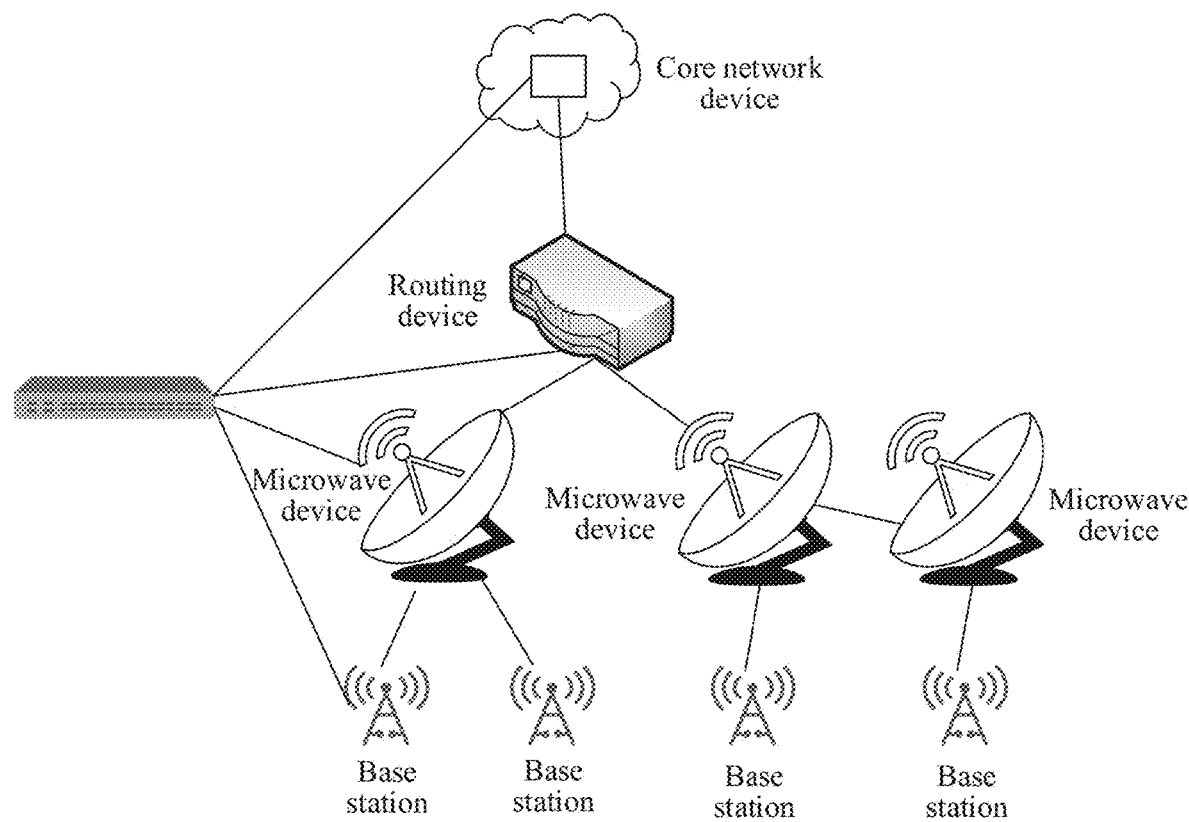
FIG. 1 is a schematic diagram of an architecture of a communication network according to an embodiment of this application.

Embodiments of this application may be applied to an architecture of a communication network shown in FIG. 1. The communication network includes a network hub, a core network device, a routing device, a microwave device, and a base station. The base station is in communication connection with the microwave device, the microwave device is in communication connection with the routing device, and the routing device is in a connection with the core network device. The network hub is in communication connection with each of the core network device, the routing device, the microwave device, and the base station, and is configured to receive an alarm from any network device of the core network device, the routing device, the microwave device, and the base station.

The core network device may be any type of core network device, for example, may be a user plane function entity, an access and mobility management function entity, or a policy control function entity. In a core network, a user plane function entity is responsible for routing and forwarding of a data packet and quality of service flow mapping; an access and mobility management function entity is responsible for encryption and integrity protection of a non-access stratum message, and is responsible for functions such as registration, access, mobility, authentication, and transparent transmission of an SMS message; and a policy control function entity is responsible for providing a policy rule for a network entity to implement execution, so as to access subscription information of a unified data warehouse.

Network devices of different types belong to different domains, and network devices of a same type belong to a same domain. For example, a microwave device and a base station are of different types, and therefore the microwave device and the base station belong to different domains. All base stations in FIG. 1 belong to a same domain, and all routing devices in FIG. 1 belong to a same domain.

In a running process of the communication network shown in FIG. 1, a fault may occur in any network device including a microwave device and a base station. When a fault occurs in a network device, an alarm occurs in the network device. Information about the alarm is stored in an alarm log in a form of an alarm record. The alarm log is sent by the network device to the network hub for processing.

The alarm record usually includes an alarm name, an alarm occurrence time point, an identifier of a device in which the alarm occurs, and the like. The alarm name may also be understood as an alarm type.

Correspondingly, after receiving an alarm log of each network device, the network hub generates a work order based on an alarm in the alarm log, and the work order indicates a worker to check and process the device in which the alarm occurs.

However, a communication network in actual application is usually much more complex than the communication network shown in FIG. 1. For example, a communication network in actual application includes more network devices of more types, and a communication connection relationship between the devices is more complex. Therefore, the network hub may receive millions of alarms within one day. If a corresponding work order is generated corresponding to each alarm, the worker needs to check a large quantity of network devices.

Actually, relative to massive alarms, faults actually occur in only a few network devices. There are generally two reasons for occurrence of this situation. First reason: In a network device, occurrence of a fault causes alarms with a plurality of names in the network device, and an alarm with each name may be generated for a plurality of times. Second reason: If a fault occurs in a network device, an alarm occurs in the network device, and an alarm also occurs in another network device in a communication connection with the network device.

Taking the communication network shown in FIG. 1 as an example, it is assumed that a fault occurs in a base station, and the base station generates alarms with a plurality of names, and an alarm with each name may be repeatedly generated, for example, an alarm with a same name is repeatedly generated 10 times within one minute. In addition, the base station in which the fault occurs may also cause alarms with a plurality of names to be generated by a microwave device in communication connection with the base station, and an alarm with each name may also be repeatedly generated. However, actually, the fault occurs in only the base station, while no fault occurs in the microwave device connected to the base station. Therefore, the worker does not need to check and process the microwave device.

It can be seen that, some alarms in the communication network are redundant, that is, no fault occurs in network devices in which alarms occur. In addition, different alarms in the communication network have an association relationship. The association relationship may be represented by a degree of association, and a redundant alarm may be found by using the degree of association. Therefore, the network hub may screen the received alarm records based on the degree of association between alarms, so as to filter out alarm records of redundant alarms and reduce a quantity of alarm records, thereby generating a work order by using a small quantity of alarm records obtained after the screening and reducing the workload of the worker.

The degree of association between alarms is diversified. For example, there may be a degree of association between alarms with two names that occur in a same network device, and there may also be a degree of association between alarms with two names that occur in different network devices. In addition, different devices may be of a same type, or may be of different types. There may be a plurality of communication connection relationships between different devices.

Therefore, to improve the alarm record screening effect, that is, to filter out alarm records of redundant alarms as much as possible, a comprehensive degree of association needs to be generated. A comprehensive degree of association may be understood as a degree of association between two alarms in a plurality of cases, for example, includes not only a degree of association between two alarms that occur in a same network device, but also a degree of association between two alarms that occur in different network devices.

Therefore, embodiments of this application provide an alarm processing method. In the method, a degree of association between alarms is generated based on an alarm attribute graph. The alarm attribute graph contains not only information such as an alarm name, an alarm occurrence time point, and devices in which alarms occur, but also types of the devices in which alarms occur and a communication connection relationship between the devices in which alarms occur. Therefore, the degree of association between alarms generated based on the alarm attribute graph is comprehensive, which can improve the alarm record screening effect.

The method provided in embodiments of this application is specifically described below. For ease of description, a network device is replaced with a device below, and the device in the following may also be referred to as a network element.

Figure 2:
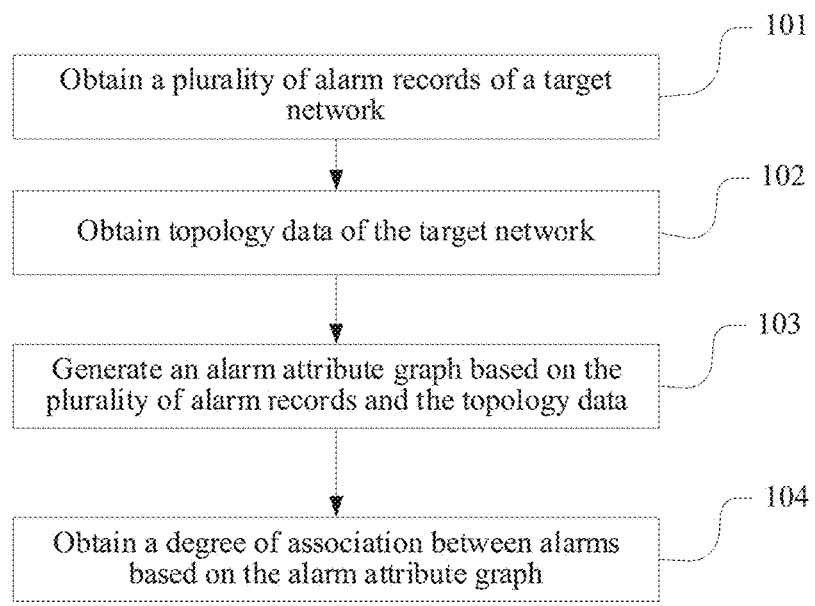
FIG. 2 is a schematic diagram of an embodiment of an alarm processing method according to an embodiment of this application.

Specifically, refer to FIG. 2. Embodiments of this application provide an embodiment of an alarm processing method. This embodiment may be applied to the network hub shown in FIG. 1. Specifically, the network hub generates a degree of association between alarms based on historical alarm records, and then screens and compresses a real-time alarm stream based on the generated degree of association between alarms. The real-time alarm stream may include a plurality of real-time alarm records. In addition, this embodiment may also be applied to any other computer device that has a rule generation capability. After the degree of association between alarms is generated, the degree of association between alarms may be stored in any memory, and then the network hub obtains the degree of association between alarms from the memory, and screens and compresses the real-time alarm stream based on the degree of association between alarms.

As shown in FIG. 2, this embodiment includes:

Step 101: Obtain a plurality of alarm records of a target network, where the target network includes a plurality of devices, and each alarm record includes an alarm name, an alarm occurrence time point, and an identifier of a device in which an alarm occurs.

The target network may be any communication network, and the communication network includes but is not limited to the communication network shown in FIG. 1. A scale of the target network and a topology structure of the target network are not specifically limited in this embodiment of this application.

An alarm name may also be referred to as an alarm type. There may be a plurality of forms of an identifier of a device in which an alarm occurs. This is not specifically limited in this embodiment of this application. For example, the identifier of the device in which an alarm occurs may be a number.

It should be understood that an alarm record is usually stored in an alarm log. Therefore, a plurality of alarm records may be obtained based on the alarm log of the target network.

The alarm log contains a distinctly redundant alarm. Therefore, the alarm records in the alarm log can be preprocessed first and then the distinctly redundant alarm in the alarm log is deleted through the preprocessing. The distinctly redundant alarm may be a distinctly incorrect alarm, or may be a distinctly repeated alarm or the like.

In an implementation, the obtaining a plurality of alarm records of a target network includes: obtaining a plurality of alarm records generated by the target network in a target time segment, where the target time segment may be set based on an actual requirement.

For example, the target time segment may be one month. In addition, the target time segment may be 20 days, 25 days, 35 days, 40 days, or the like.

Because the obtained plurality of alarm records are generated in the target network in the target time segment, it can be ensured that the plurality of alarm records are theoretically correlated, so as to avoid processing theoretically uncorrelated alarm records.

Step 102: Obtain topology data of the target network, where the topology data includes type information of the plurality of devices and a communication connection relationship between the plurality of devices.

The communication connection relationship includes a direct communication connection and an indirect communication connection. The direct communication connection may be understood as that two devices may directly communicate with each other, and the indirect communication connection may be understood as that two devices need to communicate with each other by using at least one intermediate device. The communication network shown in FIG. 1 is used as an example. A communication connection relationship between a base station and a microwave device is a direct communication connection. A communication connection relationship between a base station and a routing device is an indirect connection because the base station and the routing device are in a communication connection by using a microwave device. Similarly, a communication connection relationship between a base station and a core network device is also an indirect connection because the base station and the core network device are in a communication connection by using a microwave device and a routing device.

It should be noted that there are a plurality of methods for obtaining the topology data of the target network. This is not specifically limited in this embodiment of this application.

In an implementation, a local memory based on the network hub is generally configured to store information about the target network, and step 102 includes: obtaining network topology data from the local memory of the network hub.

In another implementation, step 102 includes: obtaining the topology data of the target network based on a device path log of the target network, where the device path log includes data of at least one communication path, the at least one communication path includes the plurality of devices, each communication path includes a plurality of devices in communication connection, and data of each communication path includes identifiers of the plurality of devices in the communication connection and type information of the plurality of devices in the communication connection.

As shown in Table 1, the data of the communication path may include a number of the communication path, a name of a device on the communication path, a type of the device on the communication path, and a number of the device on the communication path.

TABLE 1

| Number of the communication path | Name of a device | Type of the device | Number of the device on the communication path |
|---|---|---|---|
| 1 | Device 11 | Routing device | 0 |
| 1 | Device 22 | Microwave device | 1 |
| 1 | Device 33 | Radio access network device | 2 |
| 2 | Device 11 | Routing device | 0 |
| 2 | Device 44 | Microwave device | 1 |

In the foregoing table, the number of the device on the communication path may specifically indicate a quantity of hops required from any device on the communication path to a specific device. For example, on a communication path whose number is 1, a specific device is a device 11, and correspondingly, a number of the device 11 on the communication path is 0. A device 22 is connected to the device 11, and therefore, a number of the device 22 on the communication path is 1, indicating that one hop is required from the device 22 to the device 11. A device 33 is connected to the device 11 by using the device 22, and therefore, a number of the device 33 on the communication path is 2, indicating that two hops are required from the device 22 to the device 11.

A number of the communication path, a name of a device on the communication path, a type of the device on the communication path, and a number of the device on the communication path are not limited to the form shown in the foregoing table.

A path log shown in the foregoing table is used as an example. The communication path whose number is 1 includes the device 11, the device 22, and the device 33. Therefore, it may be determined that there is a communication connection relationship between the device 11, the device 22, and the device 33. A communication path whose number is 2 includes the device 11 and a device 44. Therefore, it may be determined that there is further a communication connection relationship between the device 11 and the device 44. It can be learned that, in addition to the types of the plurality of devices in the target network, a communication connection relationship between the plurality of devices in the target network may be further determined based on the device path log.

Step 103: Generate an alarm attribute graph based on the plurality of alarm records and the topology data, where the alarm attribute graph includes identifiers of the plurality of devices, the communication connection relationship between the plurality of devices, the type information of the plurality of devices, and alarm attribute information of the plurality of devices, and the alarm attribute information of each device includes a name of an alarm occurring in the device and an occurrence time point of each alarm in the device.

The identifier of the device may be in a plurality of forms, for example, may be a device name, a device number, or any other possible form. Device names may be the device 11, the device 22, the device 33, and the device 44 in Table 1, or may be a device a, a device b, a device c, a device d, a device e, a device f, a device g, and a device h shown in FIG. 4 and FIG. 5 below.

There are a plurality of methods for generating an alarm attribute graph based on a plurality of alarm records and topology data. This is not specifically limited in this embodiment of this application.

Figure 3:
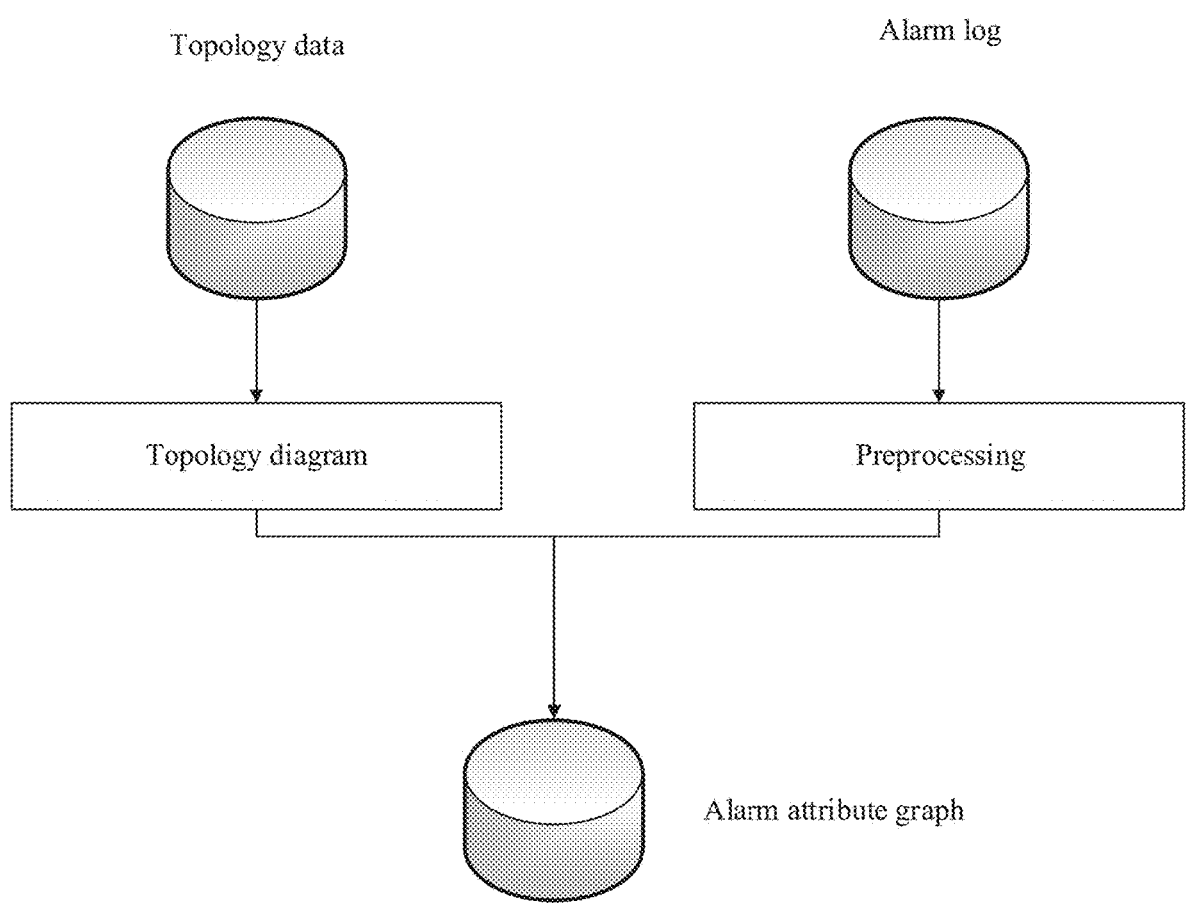
FIG. 3 is a schematic diagram of an embodiment of generating an alarm attribute graph according to an embodiment of this application.

In an implementation, as shown in FIG. 3, step 103 includes: first generating a topology diagram based on the topology data, and then mapping information in the plurality of alarm records and the type information of the plurality of devices in the topology data to the topology diagram, where the plurality of alarm records may be obtained by preprocessing an alarm log.

The topology diagram is a structural diagram of a network formed by a network device and a communication medium. The communication medium may include four types of cables: a twisted pair, an unshielded twisted pair, a coaxial cable, and an optical fiber, and wireless transmission such as radio wave, infrared ray, microwave, satellite, and laser.

The topology diagram may include a plurality of nodes, the plurality of nodes represent a plurality of devices in the target network, and a connection relationship between nodes represents a communication connection relationship between devices.

Figure 4:
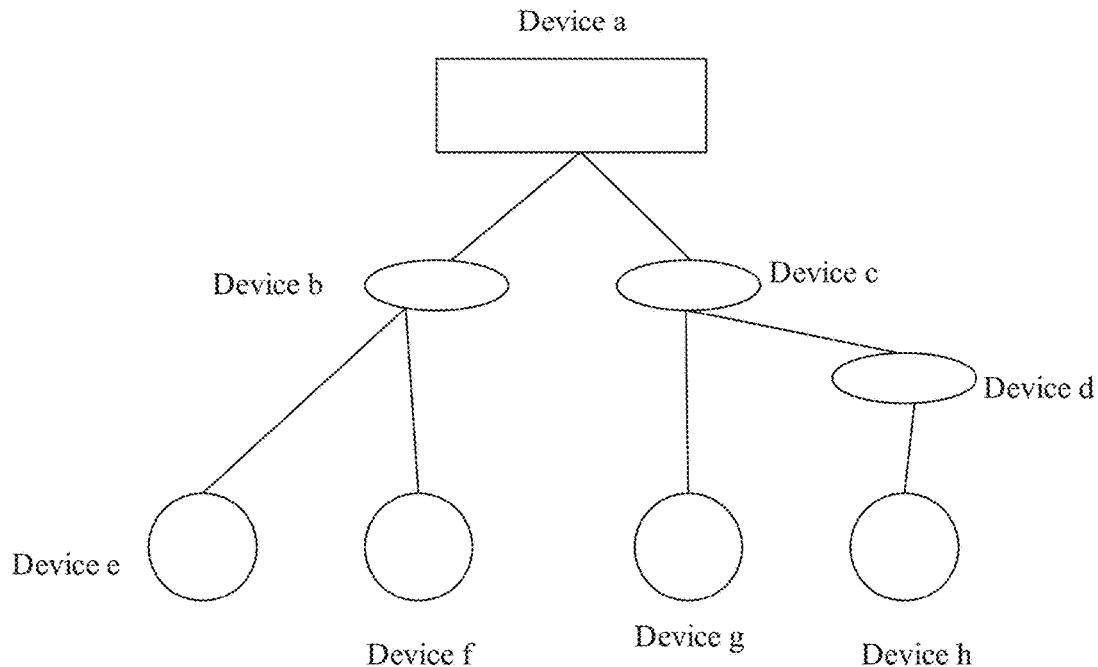
FIG. 4 is a schematic diagram of a topology diagram according to an embodiment of this application.

For example, the topology diagram may be shown in FIG. 4. The topology diagram shown in FIG. 4 includes eight nodes, where the eight nodes respectively represent a device a, a device b, a device c, a device d, a device e, a device f, a device g, and a device h; and a connection line between nodes represents a connection relationship between the nodes, and specifically represents a communication connection relationship between devices represented by the nodes. In addition, the topology diagram in FIG. 4 further uses a shape of a node to represent a type of a device, and different shapes of nodes indicate different types of devices.

Specifically, as shown in FIG. 4, a node representing the device a is rectangular, and therefore, the device a is of a type; nodes representing the device b, the device c, and the device d are elliptical, and therefore, the device b, the device c, and the device d are of a same type but different from the type of the device a; and nodes representing the device e, the device f, the device g, and the device h are circular, and therefore, the device e, the device f, the device g, and the device h are of a same type but different from the type of the device a and the type of the device b.

The mapping information in the plurality of alarm records and the types of the plurality of devices in the topology data to the topology diagram may include: adding the types of the plurality of devices to the topology diagram, and classifying the information in the plurality of alarm records based on devices in which alarms occur in the alarm records. In this way, each device in which an alarm occurs in the target network has corresponding alarm attribute information.

There may be a plurality of forms of the alarm attribute graph. This is not limited in this embodiment of this application.

For example, the topology diagram shown in FIG. 4 is used as an example. Correspondingly, the alarm attribute graph may be shown in FIG. 5. It can be seen from FIG. 5 that the alarm attribute graph indicates a device a, a device b, a device c, a device d, a device e, a device f, a device g, and a device h, and a communication connection relationship between the devices.

In addition, the alarm attribute graph further indicates types and alarm attribute information of the devices. Taking the device b as an example, it can be seen from FIG. 5 that the alarm attribute graph indicates that the type of the device b is microwave, and indicates that the alarm attribute information of the device b includes alarm names and occurrence time points of an alarm with each name. Specifically, in the alarm attribute information of the device b, the alarm names include an alarm A and an alarm B, the alarm A occurs at time points t1 and t2, and the alarm B occurs at time points t3 and t4.

Step 104: Obtain a degree of association between alarms based on the alarm attribute graph.

It should be noted that there are a plurality of methods for obtaining the degree of association between alarms based on the alarm attribute graph. This is not specifically limited in this embodiment of this application.

There may be a plurality of forms of the degree of association. This is not specifically limited in this embodiment of this application. Generally, the degree of association may be represented in a form of alarm X→alarm Y, where the alarm X is a predecessor of the degree of association, and the alarm Y is a successor of the degree of association, that is, may be considered as a possibility that the alarm X causes the alarm Y.

The possibility may be represented in a plurality of manners, including but not limited to a degree of support (Support), a degree of confidence (Confidence), and a degree of lift (Lift).

Figure 6:
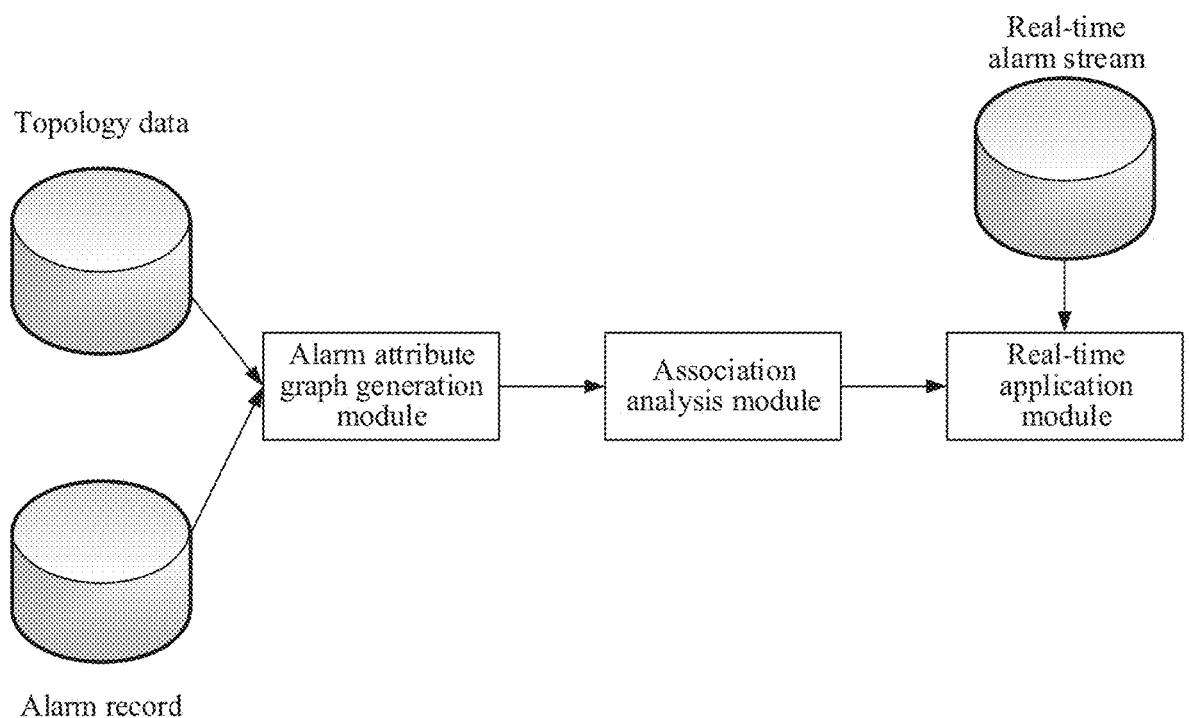
FIG. 6 is a schematic diagram of screening a real-time alarm stream according to an embodiment of this application.

It can be learned from the descriptions of step 101 to step 104 that a process of screening the real-time alarm stream by using the method provided in this embodiment of this application may be shown in FIG. 6. Specifically, taking a network hub as an example, the network hub may include an alarm attribute graph generation module, an association analysis module, and a real-time application module. The alarm attribute graph generation module generates an alarm attribute graph by using an alarm record and topology data. The association analysis module generates a degree of association between alarms based on the alarm attribute graph. The real-time application module screens a real-time alarm stream based on the obtained degree of association between alarms, where the real-time alarm stream includes a plurality of real-time alarm records.

In this embodiment of this application, the alarm attribute graph is generated based on the plurality of alarm records and the topology data of the target network. The alarm attribute graph includes not only the type of each device, the name of the alarm occurring in each device, and the time point at which the alarm with each name occurs in each device, but also the communication connection relationship between the devices. Therefore, the degree of association between the alarms in a plurality of cases can be generated based on the alarm attribute graph, so that the generated degree of association between the alarms is more comprehensive, thereby improving an alarm record screening effect, increasing an alarm record compression ratio, and reducing a quantity of alarms obtained after screening, to further reduce a quantity of generated work orders and reduce workload of a worker.

In an implementation, after step 104, the method provided in this embodiment of this application further includes: filtering out redundant alarms based on the degree of association between the alarms. Specifically, the real-time alarm records may be screened by using the degree of association between alarms, so as to filter out the redundant alarms in the real-time alarm records.

It can be learned based on the foregoing description that there are a plurality of methods for generating the degree of association between alarms based on the alarm attribute graph, and the following describes the methods in detail.

Figure 7:
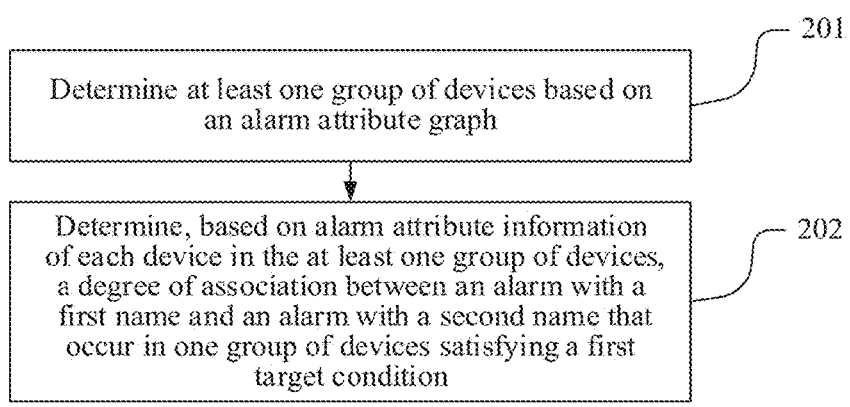
FIG. 7 is a schematic diagram of a first embodiment of generating a degree of association between alarms based on an alarm attribute graph according to an embodiment of this application.

For example, as shown in FIG. 7, step 104 may specifically include:

Step 201: Determine at least one group of devices based on the alarm attribute graph, where each group of devices in the at least one group of devices includes at least one device and satisfies a first target condition.

Step 202: Determine, based on the alarm attribute information of each device in the at least one group of devices, a degree of association between two alarms that occur in one group of devices satisfying the first target condition.

The determining at least one group of devices based on the alarm attribute graph may specifically include: determining at least one group of devices based on a communication connection relationship between a plurality of devices and type information of the plurality of devices.

In this embodiment, the at least one group of devices satisfying the first target condition is determined based on the communication connection relationship and the type information of the devices. Therefore, the first target condition is correlated to the communication connection relationship between the devices and the types of the devices. In addition, the first target condition may be correlated to a quantity of the devices. Specific content of the first target condition may be set based on an actual requirement.

Because each group of devices satisfies the first target condition, it may be considered that degrees of association between two alarms that occur in each group of devices are the same. Therefore, in this embodiment, one group of devices satisfying the first target condition may be determined, or a plurality of groups of devices satisfying the first target condition may be determined.

There may be a plurality of cases based on the first target condition. The following describes three of the cases of the first target condition with reference to FIG. 5.

First Case of the First Target Condition the first target condition includes: each group of devices includes one device and a type of the device in each group of devices is a first type.

The first type may be any type of the device.

Figure 5:
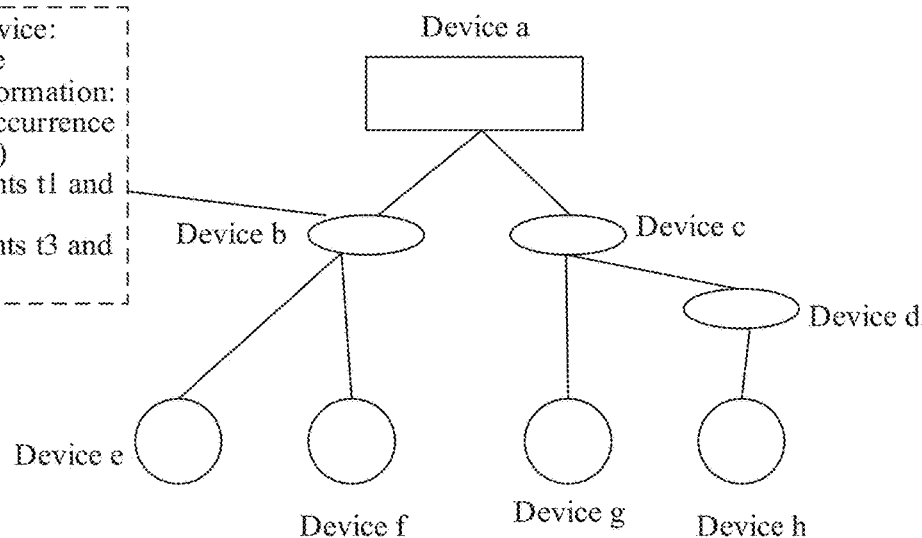
FIG. 5 is a schematic diagram of an alarm attribute graph according to an embodiment of this application.

For example, as shown in FIG. 5, four groups of devices may be determined based on the communication connection relationship between the plurality of devices and the types of the plurality of devices. The four groups of devices respectively include the device e, the device f, the device g, and the device h. It can be learned from the shapes of the nodes in FIG. 5 that the device e, the device f, the device g, and the device h are of a same type.

For example, as shown in FIG. 5, three groups of devices may be determined based on the communication connection relationship between the plurality of devices and the types of the plurality of devices. The three groups of devices respectively include the device b, the device c, and the device d. It can be learned from the shapes of the nodes in FIG. 5 that the device b, the device c, and the device d are of a same type.

It can be learned based on the foregoing description that the first case of the first target condition is a case of a single device. In this case, a degree of association between two alarms that occur in a single device may be determined.

Second Case of the First Target Condition the first target condition includes: each group of devices includes two devices, types of the two devices in each group of devices are both a first type, and the two devices in each group of devices are in communication connection.

The first type may be any type of the device.

There are a plurality of cases in which two devices in each group of devices are in a communication connection by using a same quantity of devices. For example, two devices in each group of devices are in a direct communication connection. For another example, two devices in each group of devices are in an indirect communication connection. Specifically, two devices in each group of devices are in a communication connection by using one device, or two devices in each group of devices are in a communication connection by using two devices, and the rest can be deduced by analogy.

For example, as shown in FIG. 5, one group of devices may be determined based on the communication connection relationship between the plurality of devices and the types of the plurality of devices. The group of devices include the device c and the device d. It can be learned from the shapes of the nodes in FIG. 5 that the device c and the device d are of a same type.

It can be learned based on the foregoing description that the second case is different from the first case. In the second case of the first target condition, each group of devices includes two devices of a same type. Therefore, the second case of the first target condition is a cross-device case. In this case, a degree of association between an alarm that occurs in one device and an alarm that occurs in the other device in a group of devices satisfying the first target condition may be determined.

In the group of devices satisfying the first target condition, a name of an alarm that occurs in one device may be the same as or different from a name of an alarm that occurs in the other device.

Third Case of the First Target Condition the first target condition includes: each group of devices includes two devices, types of the two devices in each group of devices are a first type and a second type respectively, and the two devices in each group of devices are in communication connection.

The first type and the second type are different and may be any two types of the devices.

A communication connection relationship between two devices in each group of devices in the third case is the same as a communication connection relationship between two devices in each group of devices in the second case. For details, refer to related descriptions of the second case for understanding.

For example, as shown in FIG. 5, four groups of devices may be determined based on the communication connection relationship between the plurality of devices and the types of the plurality of devices, and two devices in each group of devices are in direct communication connection. Specifically, the device b and the device e form a first group of devices, the device b and the device f form a second group of devices, the device c and the device g form a third group of devices, and the device d and the device h form a fourth group of devices. It can be learned from the shapes of the nodes in FIG. 5 that types of two devices included in any one of the four groups of devices are different, and types of devices included in any one of the four groups of devices are the same as types of devices included in any other group of devices.

For example, as shown in FIG. 5, four groups of devices may be determined based on the communication connection relationship between the plurality of devices and the types of the plurality of devices, and two devices in each group of devices are in communication connection by using one device. Specifically, the device a and the device e form a first group of devices, the device a and the device f form a second group of devices, and the device a and the device g form a third group of devices. Because the device a and the device h are in a communication connection by using two devices, the device a and the device h cannot be used as a group of devices. It can be learned from the shapes of the nodes in FIG. 5 that types of two devices included in any one of the three groups of devices are different, and types of devices included in any one of the three groups of devices are the same as types of devices included in any other group of devices.

It can be learned based on the foregoing description that the third case is different from the second case. In the third case of the first target condition, each group of devices includes two devices of different types. Because devices of different types belong to different domains, the third case of the first target condition is a cross-domain case. In this case, a degree of association between an alarm that occurs in a device of the first type and an alarm that occurs in a device of the second type in a group of devices satisfying the first target condition may be determined.

In the group of devices satisfying the first target condition, a name of the alarm that occurs in the device of the first type may be the same as or different from a name of the alarm that occurs in the device of the second type.

It should be noted that, for the first target condition in different cases, degrees of association between two alarms in different scenarios may be generated. Therefore, to ensure comprehensiveness of the degrees of association, the foregoing three cases of the first target condition may be combined to generate degrees of association between alarms. In this way, the finally obtained degrees of association include: a degree of association between two alarms that occur in a single device, a degree of association between two alarms that occur in two devices of a same type, and a degree of association between two alarms that occur in two devices of different types.

Alarms with two names corresponding to the first target condition in different cases may be the same or may be different.

It can be learned based on the foregoing description that in this embodiment of this application, a degree of association between alarms with any two names in any group of devices satisfying the first target condition may be generated. Compared with a method in which alarms are grouped based on occurrence time points and then each group of alarms is analyzed by using a frequent item set mining algorithm, this embodiment of this application can avoid a case that degrees of association between alarms in different groups cannot be obtained because all alarms generated by a group of devices satisfying the first target condition are grouped based on time points. Therefore, degrees of association generated by using the method provided in this embodiment of this application are more comprehensive, and an alarm record screening effect can be improved.

For example, alarms generated by one device that satisfies the first target condition include an alarm 1, an alarm 2, an alarm 3, and an alarm 4, and the four alarms are of different alarm types. If the alarm 1 and the alarm 2 are put in one group based on time points, and the alarm 3 and the alarm 4 are put in one group, only a degree of association between the alarm 1 and the alarm 2 and a degree of association between the alarm 3 and the alarm 4 can be obtained, but a degree of association between either of the alarm 1 and the alarm 2 and either of the alarm 3 and the alarm 4 cannot be obtained.

However, by using the method provided in this embodiment of this application, a degree of association between any two of the alarm 1, the alarm 2, the alarm 3, and the alarm 4 may be obtained.

The following uses a cross-domain example for description.

For example, it is assumed that one of two devices satisfying the first target condition generates an alarm 1 and an alarm 2, and the other of the two devices satisfying the first target condition generates an alarm 3 and an alarm 4. If one primary alarm (assuming that the primary alarm is the alarm 1) is selected from the alarm 1 and the alarm 2, one primary alarm (assuming that the primary alarm is the alarm 3) is selected from the alarm 3 and the alarm 4, and then a degree of association between the alarm 1 and the alarm 3 that are generated by the two devices satisfying the first target condition is determined, a degree of association between the alarm 2 and the alarm 4 that are generated by the two devices satisfying the first target condition cannot be obtained.

However, in some scenarios, association between the alarm 2 and the alarm 4 that are generated by the two devices satisfying the first target condition may be strong. Therefore, the foregoing method causes a problem that the generated degree of association between alarms is not comprehensive. However, by using the method provided in this embodiment of this application, a degree of association between any two of the alarm 1, the alarm 2, the alarm 3, and the alarm 4 may be obtained.

In the foregoing embodiments, regardless of the first target condition in any case, there are a plurality of methods capable of determining a degree of association between two alarms that occur in a group of devices satisfying the first target condition.

Figure 8:
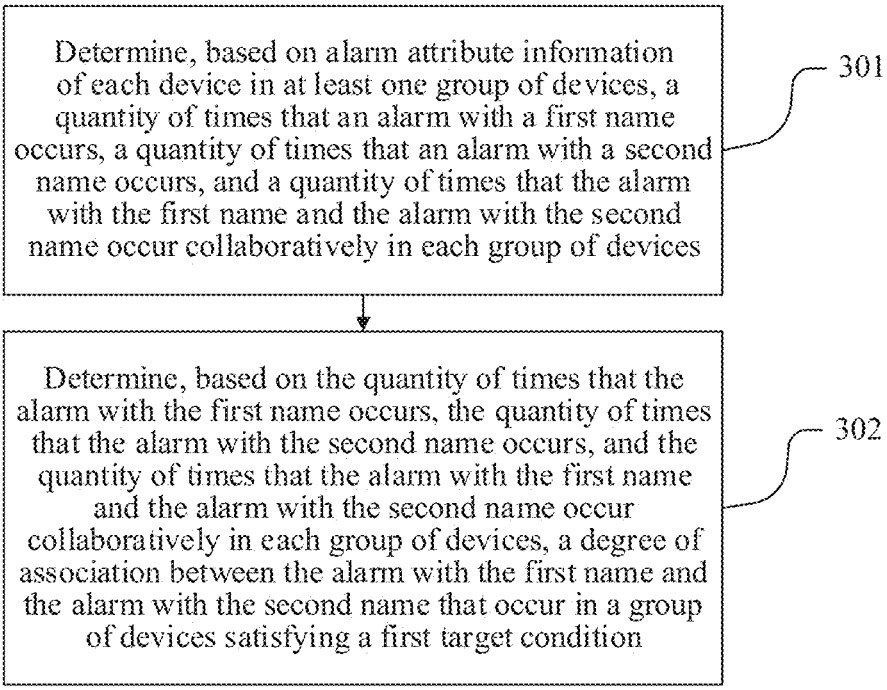
FIG. 8 is a schematic diagram of a second embodiment of generating a degree of association between alarms based on an alarm attribute graph according to an embodiment of this application.

In an implementation, as shown in FIG. 8, step 202 may specifically include:

Step 301: Determine, based on the alarm attribute information of each device in the at least one group of devices, a quantity of times that an alarm with a first name occurs, a quantity of times that an alarm with a second name occurs, and a quantity of times that the alarm with the first name and the alarm with the second name occur collaboratively in each group of devices, and determine that a collaborative occurrence rule is that a time point at which the alarm with the first name occurs and a time point at which the alarm with the second name occurs satisfy a second target condition.

Because the alarm attribute information of the device includes a name of an alarm that occurs in the device and an occurrence time point of an alarm with each name in the device, for an alarm with a first name, a quantity of times that the alarm with the first name occurs in the device may be determined based on a quantity of occurrence time points of the alarm with the first name in each device; and quantities of times that the alarm with the first name occurs in devices in a group of devices are added to obtain the quantity of times that the alarm with the first name occurs in the group of devices.

The quantity of times that the alarm with the second name occurs in each group of devices may be determined by using the same method as the foregoing method.

In this embodiment of this application, it is determined, based on a time point at which the alarm with the first name occurs and a time point at which the alarm with the second name occurs, that the alarm with the first name and the alarm with the second name occur collaboratively. Specifically, when the time point at which the alarm with the first name occurs and the time point at which the alarm with the second name occurs satisfy the second target condition, it is determined that the alarm with the first name and the alarm with the second name occur collaboratively.

The second target condition may be set based on an actual requirement. For example, the second target condition may include that an absolute value of a difference between an occurrence time point of the alarm with the first name and an occurrence time point of the alarm with the second name is less than preset duration. The preset duration may be adjusted based on an actual requirement. For example, the preset duration may be set to 5 minutes, or may be set to 10 minutes or another proper value. A meaning of the preset duration includes: If an absolute value of a difference between occurrence time points of two alarms is greater than the preset duration, it is considered that there is a weak causal relationship or no causal relationship between the two alarms, and therefore a degree of association between the two alarms may not be considered.

If the degree of association indicates a possibility that the alarm with the first name causes the alarm with the second name, an occurrence time point of the alarm with the second name is usually later than an occurrence time point of the alarm with the first name. Correspondingly, the second target condition may specifically include: A difference between the occurrence time point of the alarm with the second name and the occurrence time point of the alarm with the first name is less than preset duration.

The following describes, by using a specific example, a process of determining that the alarm with the first name and the alarm with the second name collaboratively occur.

For example, the first target condition is the first case. In this case, the alarm with the first name and the alarm with the second name are generated by one device, the alarm with the first name is an alarm A, and the alarm with the second name is an alarm B. The device b in FIG. 5 is used as an example. The alarm A occurs at a time point t1 and a time point t2 separately, and the alarm B occurs at a time point t3 and a time point t4 separately. If a difference between the time point t2 at which the alarm B occurs and the time point t1 at which the alarm A occurs is less than the preset duration, it indicates that the alarm A and the alarm B occur collaboratively once. On this basis, if a difference between the time point t4 at which the alarm B occurs and the time point t3 at which the alarm A occurs is less than the preset duration, it indicates that the alarm A and the alarm B occur collaboratively twice.

For example, the first target condition is the second case. In this case, the alarm with the first name and the alarm with the second name are respectively generated by two devices of a same type, the alarm with the first name is an alarm C, and the alarm with the second name is an alarm D. The device c and the device d in FIG. 5 are used as an example. Because types of the device c and the device d are the same, alarms with a same name may occur in the device c and may also occur in the device d. Specifically, the alarm C and the alarm D occur at a time point t5 and a time point t6 respectively in the device c, and the alarm C and the alarm D occur at a time point t7 and a time point t8 respectively in the device d. If a difference between the time point t8 at which the alarm D occurs in the device d and the time point t5 at which the alarm C occurs in the device c is less than the preset duration, it indicates that the alarm C and the alarm D occur collaboratively once. On this basis, if a difference between the time point t6 at which the alarm D occurs in the device c and the time point t7 at which the alarm C occurs in the device d is less than the preset duration, it indicates that the alarm D and the alarm C occur collaboratively twice.

For example, the first target condition is the third case. In this case, the alarm with the first name and the alarm with the second name are respectively generated by two devices of different types, and a process of determining that the alarm with the first name and the alarm with the second name collaboratively occur is similar to the process of determining that the alarm with the first name and the alarm with the second name collaboratively occur in the second case. Details are not described herein again.

Step 302: Determine, based on the quantity of times that the alarm with the first name occurs, the quantity of times that the alarm with the second name occurs, and the quantity of times that the alarm with the first name and the alarm with the second name occur collaboratively in each group of devices, a degree of association between the alarm with the first name and the alarm with the second name that occur in a group of devices satisfying the first target condition.

It may be understood that, because each of the at least one group of devices satisfies the first target condition, when there are a plurality of groups of devices, an initial degree of association may be first determined corresponding to each group of devices, and then a final degree of association is determined based on the initial degree of association corresponding to each group of devices.

In addition, when a plurality of groups of devices are included, a total quantity of times that the alarm with the first name occurs in the plurality of groups of devices may also be obtained by adding quantities of times that the alarm with the first name occurs in the plurality of groups of devices. Similarly, a total quantity of times that the alarm with the second name occurs in the plurality of groups of devices and a total quantity of times that the alarm with the first name and the alarm with the second name collaboratively occur in the plurality of groups of devices may be obtained. Then, the degree of association is determined based on the total quantity of times that the alarm with the first name occurs, the total quantity of times that the alarm with the second name occurs, and the total quantity of times that the alarm with the first name and the alarm with the second name occur collaboratively.

Figure 9:
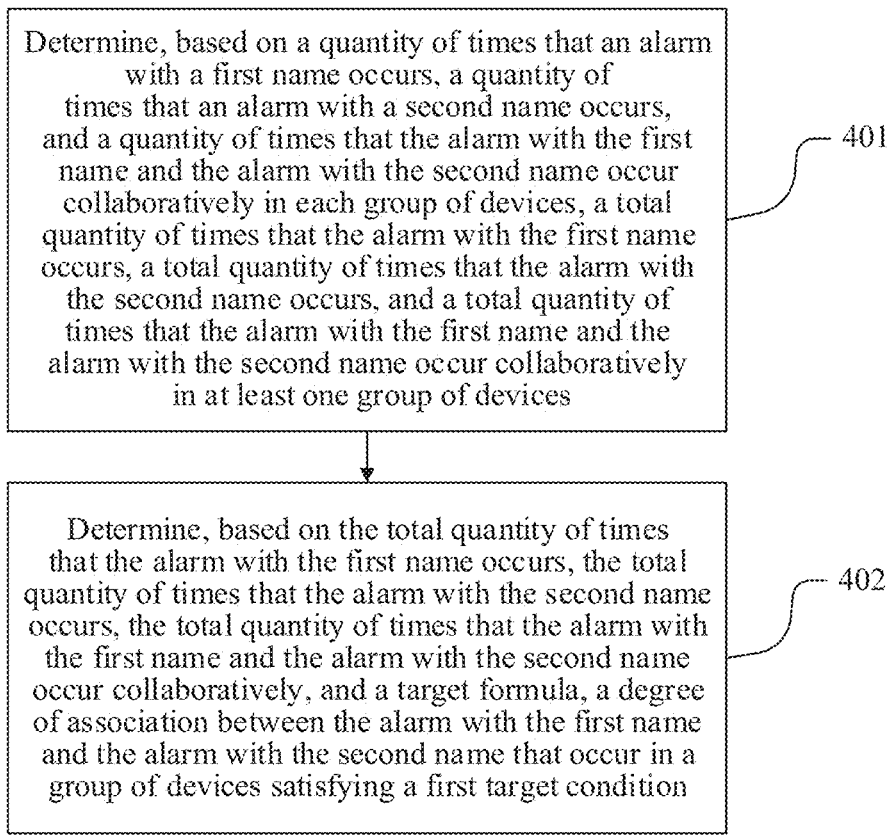
FIG. 9 is a schematic diagram of a third embodiment of generating a degree of association between alarms based on an alarm attribute graph according to an embodiment of this application.

Specifically, as shown in FIG. 9, step 302 may specifically include:

Step 401: Determine, based on the quantity of times that the alarm with the first name occurs, the quantity of times that the alarm with the second name occurs, and the quantity of times that the alarm with the first name and the alarm with the second name occur collaboratively in each group of devices, a total quantity of times that the alarm with the first name occurs, a total quantity of times that the alarm with the second name occurs, and a total quantity of times that the alarm with the first name and the alarm with the second name occur collaboratively in the at least one group of devices.

Step 402: Determine, based on the total quantity of times that the alarm with the first name occurs, the total quantity of times that the alarm with the second name occurs, the total quantity of times that the alarm with the first name and the alarm with the second name occur collaboratively, and a target formula, a degree of association between the alarm with the first name and the alarm with the second name that occur in a group of devices satisfying the first target condition.

In this embodiment, the degree of association indicates a possibility that the alarm with the first name causes the alarm with the second name or a possibility that the alarm with the second name causes the alarm with the first name.

It can be learned based on the foregoing description that the possibility may be represented in a plurality of forms such as a degree of support (Support), a degree of confidence (Confidence), and a degree of lift (Lift). However, for some forms of the possibility, the calculated possibility that the alarm with the first name causes the alarm with the second name is the same as the calculated possibility that the alarm with the second name causes the alarm with the first name, making it impossible to reflect relative degrees of importance of the alarm with the first name and the alarm with the second name.

For example, if degrees of lift (Lift) are used to represent a possibility that the alarm with the first name causes the alarm with the second name and a possibility that the alarm with the second name causes the alarm with the first name, the calculated possibility that the alarm with the first name causes the alarm with the second name is the same as the calculated possibility that the alarm with the second name causes the alarm with the first name.

Therefore, in this embodiment of this application, the target formula is an asymmetric measurement formula. If the target formula is used, when the alarm with the first name and the alarm with the second name do not always occur together, the calculated possibility that the alarm with the first name causes the alarm with the second name is different from the calculated possibility that the alarm with the second name causes the alarm with the first name. Therefore, the asymmetric measurement formula may be understood as each formula that can measure a difference between the possibility that the alarm with the first name causes the alarm with the second name and the possibility that the alarm with the second name causes the alarm with the first name.

Specifically, the target formula can cause the possibility that the alarm with the first name causes the alarm with the second name to be not equal to the possibility that the alarm with the second name causes the alarm with the first name when the total quantity of times that the alarm with the first name occurs is not equal to the total quantity of times that the alarm with the second name occurs, thereby reflecting relative degrees of importance of the alarm with the first name and the alarm with the second name.

For example, if the possibility that the alarm with the first name causes the alarm with the second name is larger, it indicates that the alarm with the first name is more likely to reflect the fault of the device, and therefore the alarm with the first name is more important than the alarm with the second name. Similarly, if the possibility that the alarm with the second name causes the alarm with the first name is larger, it indicates that the alarm with the second name is more likely to reflect the fault of the device, and therefore the alarm with the second name is more important than the alarm with the first name.

It should be noted that, when the target formula can cause the possibility that the alarm with the first name causes the alarm with the second name to be not equal to the possibility that the alarm with the second name causes the alarm with the first name, there may be a plurality of target formulas.

In an implementation, when the degree of association indicates the possibility that the alarm with the first name causes the alarm with the second name, the target formula may include:

$$P_{A\,to\,B} = \frac{n_{AB}/n_A}{Y - n_{AB}/n_B},$$

where $P_{A\,to\,B}$ represents the possibility that the alarm with the first name causes the alarm with the second name, Y is a constant greater than or equal to 2, $n_A$ represents the total quantity of times that the alarm with the first name occurs, $n_B$ represents the total quantity of times that the alarm with the second name occurs, and $n_{AB}$ represents the total quantity of times that the alarm with the first name and the alarm with the second name occur collaboratively.

Generally, if the total quantity of times that the alarm with the first name occurs is equal to the total quantity of times that the alarm with the second name occurs and is equal to the total quantity of times that the alarm with the first name and the alarm with the second name occur collaboratively, it means that the alarm with the first name and the alarm with the second name occur together. In this case, it may be considered that the possibility that the alarm with the first name causes the alarm with the second name is 1 and the possibility that the alarm with the second name causes the alarm with the first name is also 1.

For the foregoing target formula, if Y is equal to 2, when $n_A$ is equal to $n_B$ and is equal to $n_{AB}$, P is 1; and if Y is greater than 2, when $n_A$ is equal to $n_B$ and is equal to $n_{AB}$, P is less than 1. Therefore, 2 is a better value of Y When Y is 2, a calculated possibility is more practical.

The following describes the foregoing process by using a specific example.

Figure 10:
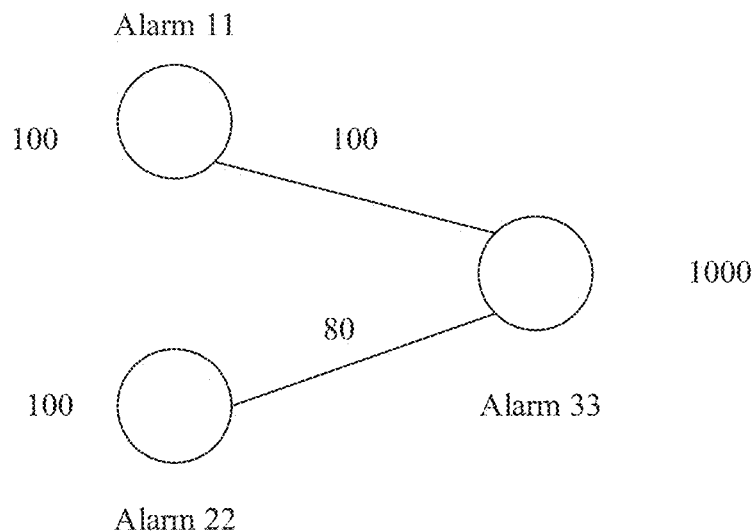
FIG. 10 is an example diagram of quantities of times that a plurality of alarms occur according to an embodiment of this application.

In this example, Y is equal to 2. As shown in FIG. 10, alarms that occur in at least one group of devices include an alarm 11, an alarm 22, and an alarm 33, where the alarm 11, the alarm 22, and the alarm 33 respectively represent three alarms with different names. Total quantities of times that the alarm 11, the alarm 22, and the alarm 33 occur in the at least one group of devices are 100, 100, and 1000 respectively. 100 on a connection line between the alarm 11 and the alarm 33 indicates that a total quantity of times that the alarm 11 and the alarm 33 occur collaboratively in the at least one group of devices is 100, and 80 on a connection line between the alarm 22 and the alarm 33 indicates that a total quantity of times that the alarm 22 and the alarm 33 occur collaboratively in the at least one group of devices is 80.

That the alarm 11 and the alarm 33 occur collaboratively means that a difference between occurrence time points of the alarm 11 and the alarm 33 is less than specified duration. Similarly, that the alarm 22 and the alarm 33 occur collaboratively means that a difference between occurrence time points of the alarm 22 and the alarm 33 is less than the specified duration.

If calculation is performed based on the foregoing target formula, a possibility that the alarm 11 causes the alarm 33 is $$\frac{100/100}{2-100/1000},$$

and is approximately equal to 0.526; and a possibility that the alarm 33 causes the alarm 11 is $$\frac{100/100}{2-100/1000},$$

and is approximately equal to 0.1. Therefore, it can be seen that the total quantity of times that the alarm 11 occurs is less than the total quantity of times that the alarm 33 occurs, but the calculated possibility that the alarm 11 causes the alarm 33 is greater than the calculated possibility that the alarm 33 causes the alarm 11.

A possibility that the alarm 22 causes the alarm 33 is $$\frac{80/100}{2-80/1000},$$

and is approximately equal to 0.417. A possibility that the alarm 33 causes the alarm 22 is $$\frac{80/100}{2-80/1000},$$

and is approximately equal to 0.067. Therefore, it can be seen that the total quantity of times that the alarm 22 occurs is less than the total quantity of times that the alarm 33 occurs, but the calculated possibility that the alarm 22 causes the alarm 33 is greater than the calculated possibility that the alarm 33 causes the alarm 11.

It can be learned based on the foregoing calculation result that the target formula in this embodiment of this application can reflect relative degrees of importance of the alarm with the first name and the alarm with the second name.

It may be understood that, in actual application, a reason why an alarm with a name occurs for a large quantity of times may be that occurrence of an alarm with any other name causes occurrence of the alarm with the name. Therefore, if an alarm with a name occurs for a large quantity of times, it does not necessarily indicate that the alarm with the name is important, but an alarm with a name that occurs for a small quantity of times can better reflect a root cause of a fault.

Therefore, if a degree of support is used to indicate a possibility that the alarm with the first name causes the alarm with the second name, a larger total quantity of times that the alarm with the first name occurs and a larger total quantity of times that the alarm with the second name occurs indicate a higher calculated possibility that the alarm with the first name causes the alarm with the second name. Therefore, using the degree of support to indicate the possibility is only beneficial to an alarm that occurs for a large quantity of times.

However, this embodiment of this application is different. Based on the foregoing calculation result, it can be seen that the total quantity of occurrence times of the alarm 11 is less than the total quantity of occurrence times of the alarm 33, but the calculated possibility that the alarm 11 causes the alarm 33 is greater than the calculated possibility that the alarm 33 causes the alarm 11. Similarly, the total quantity of times that the alarm 22 occurs is less than the total quantity of times that the alarm 33 occurs, but the calculated possibility that the alarm 22 causes the alarm 33 is greater than the calculated possibility that the alarm 33 causes the alarm 11. Therefore, the target formula in this embodiment of this application can further reflect importance of an alarm that occurs for a small quantity of times.

In this embodiment of this application, to ensure comprehensiveness of degrees of association, degrees of association in a plurality of scenarios are usually generated. For example, when the first target condition is the first case, a degree of association between alarms with two names is generated; when the first target condition is the second case, a degree of association between alarms with two names is generated; and when the first target condition is the third case, a degree of association between alarms with two names is also generated.

Therefore, there may be a plurality of degrees of association. However, if a degree of association indicates a possibility that an alarm with a name causes an alarm with another name, a degree of association with a low possibility inevitably exists in the plurality of degrees of association, and it indicates that association between alarms with two names that is indicated by the degree of association is poor. If the real-time alarm stream is screened by using a degree of association with a low possibility, some alarm records that can reflect the root cause of the fault may be filtered out.

Therefore, a degree of association with a small possibility may be removed from the plurality of degrees of association.

In an implementation, there are a plurality of degrees of association between the alarms, and each degree of association indicates a possibility that an alarm with a name causes an alarm with another name.

After the generating a degree of association between alarms based on the alarm attribute graph, the method further includes:

screening the plurality of degrees of association to select at least one degree of association that is greater than a target threshold.

The target threshold may be set based on an actual situation. This is not specifically limited in this embodiment of this application.

In this embodiment of this application, the plurality of generated degrees of association are screened by using the target threshold, and then a real-time alarm stream is screened by using a degree of association obtained after the screening, so as to avoid a case that some important alarms that can reflect a fault are filtered out because the real-time alarm stream is screened by using a degree of association with a low possibility.

In addition, it can be learned based on the foregoing description that, for the alarm with the first name and the alarm with the second name, the degree of association may indicate a possibility that the alarm with the first name causes the alarm with the second name or may indicate a possibility that the alarm with the second name causes the alarm with the first name.

Therefore, in the generated degrees of association, there may be two degrees of association between alarms with two names simultaneously. In this case, one degree of association can be selected by screening the two degrees of association. Specifically, before at least one degree of association that is greater than the target threshold is selected by screening the plurality of degrees of association, preliminary screening may be performed on the plurality of degrees of association, so that only one degree of association between alarms with two names exists in degrees of association obtained after the screening.

It should be noted that there may be a plurality of preliminary screening rules. For example, when the type of the device in which the alarm with the first name occurs is the same as the type of the device in which the alarm with the second name occurs, one degree of association with a larger possibility may be selected by screening two degrees of association between the alarm with the first name and the alarm with the second name.

For example, when the type of the device in which the alarm with the first name occurs is different from the type of the device in which the alarm with the second name occurs, preliminary screening may be performed based on relative locations of the device in which the alarm with the first name occurs and the device in which the alarm with the second name occurs in the communication network. Specifically, if a distance between the device in which the alarm with the first name occurs and the core network is smaller than a distance between the device in which the alarm with the second name occurs and the core network, a degree of association indicating a possibility that the alarm with the first name causes the alarm with the second name is generally retained, while a degree of association indicating a possibility that the alarm with the second name causes the alarm with the first name is discarded.

Figure 11:
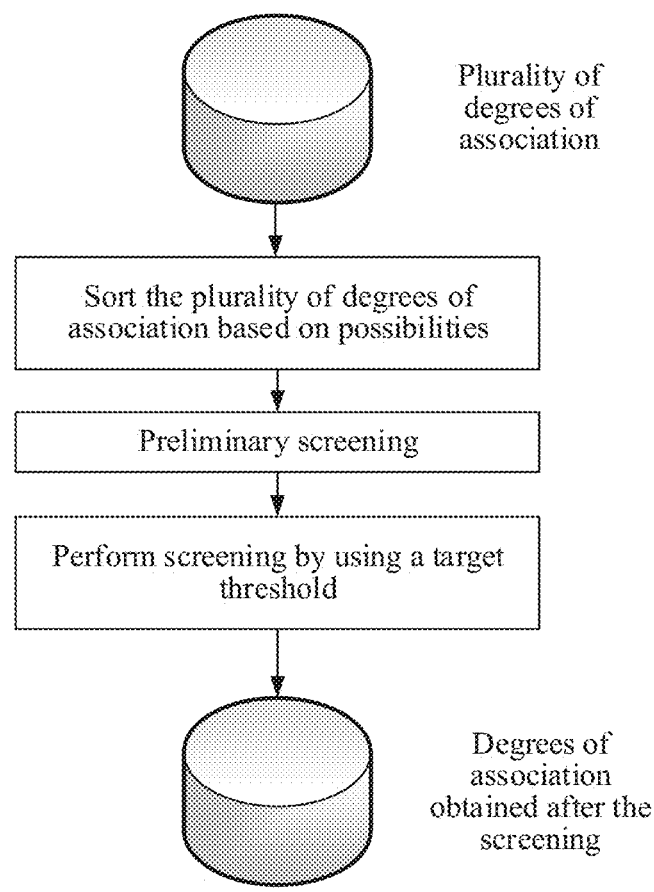
FIG. 11 is a schematic diagram of an embodiment of screening a plurality of degrees of association according to an embodiment of this application.

Therefore, as shown in FIG. 11, a process of screening a plurality of degrees of association may include: first sorting the plurality of degrees of association based on possibilities, then performing preliminary screening based on a preliminary screening rule, and finally performing screening by using a target threshold.

In the foregoing embodiment, the plurality of degrees of association are screened by using the target threshold. There are a plurality of methods for determining the target threshold. For example, the target threshold may be determined based on experience of a worker, or the target threshold may be determined by using the following method.

Figure 12:
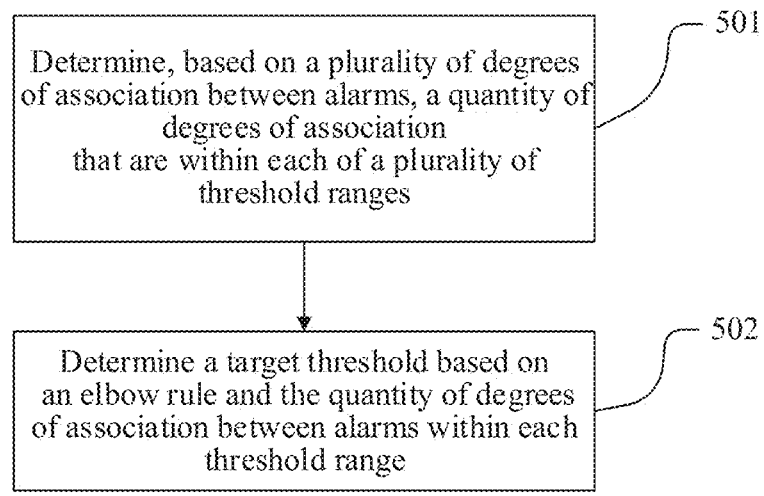
FIG. 12 is a schematic diagram of an embodiment of determining a target threshold according to an embodiment of this application.

As shown in FIG. 12, in an implementation, after the generating a degree of association between alarms based on the alarm attribute graph, and before the screening the plurality of degrees of association to select at least one degree of association that is greater than a threshold, the method further includes:

Step 501: Determine, based on the plurality of degrees of association between the alarms, a quantity of degrees of association that are within each of a plurality of threshold ranges.

For example, a plurality of threshold ranges of the degrees of association may be preset, and a length of each threshold range may be adjusted based on an actual requirement. Then, a quantity of degrees of association within each threshold range in the plurality of degrees of association is calculated.

Step 502: Determine the target threshold based on the quantity of degrees of association between alarms within each threshold range.

The target threshold may be determined by using a plurality of methods. For example, the target threshold may be determined based on an elbow rule and the quantity of degrees of association between alarms within each threshold range.

The elbow rule is used to reflect a variation of an improvement effect of a distortion degree. A location where a decrease amplitude of the improvement effect of the distortion degree slows down is an elbow.

For example, the following group of two-dimensional data (1, 20), (2, 16), (3, 11), (4, 7), (5, 6), and (6, 5) corresponds, where a vertical coordinate of the two-dimensional data is used to reflect an improvement effect of a distortion degree. It can be seen that, as horizontal coordinates increase, vertical coordinates gradually decrease, and decrease amplitudes of the vertical coordinates are 20−16=4, 16−11=5, 11−7=4, 7−6=1, and 6−5=1 respectively. Therefore, it can be seen that when the horizontal coordinate is 5, the decrease amplitude of the vertical coordinate is 1, which is distinctly less than the decrease amplitude 4 of the vertical coordinate when the horizontal coordinate is 4. Therefore, a location of the horizontal coordinate 5 is an elbow.

In this embodiment of this application, the elbow rule reflects a variation of a quantity of degrees of association between alarms within each threshold range.

Figure 13:
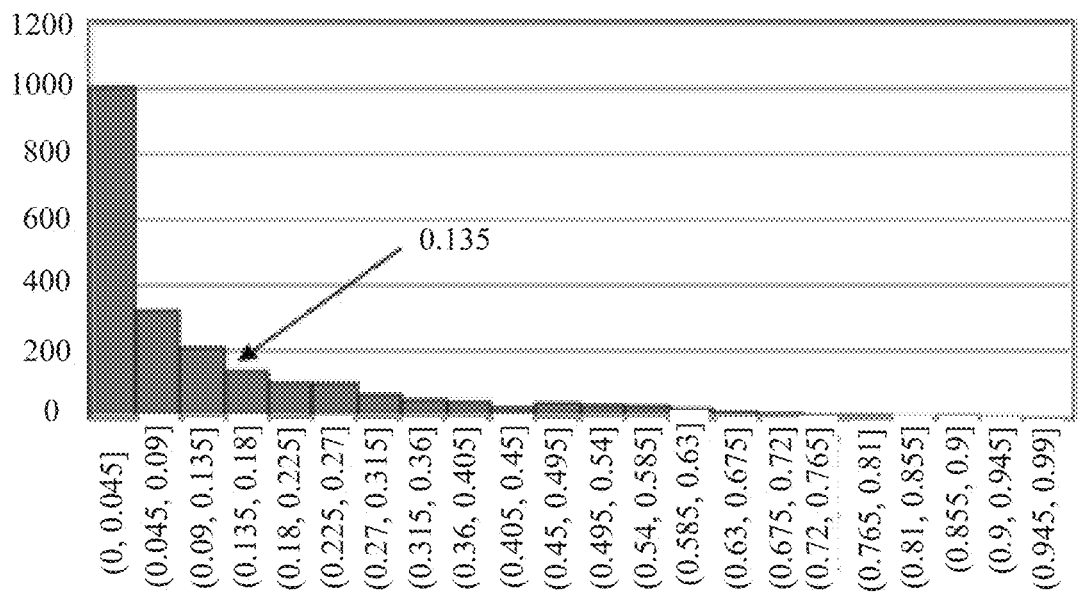
FIG. 13 is a schematic diagram of distribution of quantities of degrees of association between alarms within threshold ranges.

As shown in FIG. 13, a horizontal coordinate represents a threshold range of degrees of association, and a vertical coordinate represents a quantity of degrees of association between alarms within each threshold range. In FIG. 13, values of degrees of association range from 0 to 0.99, and each interval of 0.045 is one threshold range. Therefore, FIG. 13 includes 22 threshold range of degrees of association. Statistics are collected on a quantity of degrees of association in each of the 22 threshold ranges in the plurality of degrees of association.

It can be learned from FIG. 13 that, as the degree of association increases, a quantity of degrees of association within each threshold range gradually decreases. For example, a quantity of degrees of association in a threshold range (0, 0.045] is approximately 1000, a quantity of degrees of association in a threshold range (0.045, 0.099] is approximately 300, a quantity of degrees of association in a threshold range (0.099, 0.135] is approximately 200, a quantity of degrees of association in a threshold range (0.135, 0.18] is approximately 130, and a quantity of degrees of association in a threshold range (0.18, 0.225] is approximately 100. Decrease amplitudes of the degrees of association are 100−300=700, 300−200=100, 200−130=70, and 130-100=30 in sequence. It can be learned that when the threshold range is (0.135, 0.18], the decrease amplitude of the quantity of degrees of association decreases, and the decrease speed decreases. Therefore, the threshold range (0.135, 0.18] is an elbow. It should be noted that, after the threshold range corresponding to the elbow is determined, a degree of association is selected from the threshold range corresponding to the elbow as the target threshold.

There are a plurality of selection methods, and this is not limited in this embodiment of this application. For example, a boundary point of the threshold range may be selected as the target threshold. Specifically, in the foregoing example, the threshold range corresponding to the elbow is the threshold range (0.135, 0.18]. Therefore, 0.135 may be used as the target threshold. In addition, a value may alternatively be randomly selected from the threshold range as the target threshold.

Figure 14:
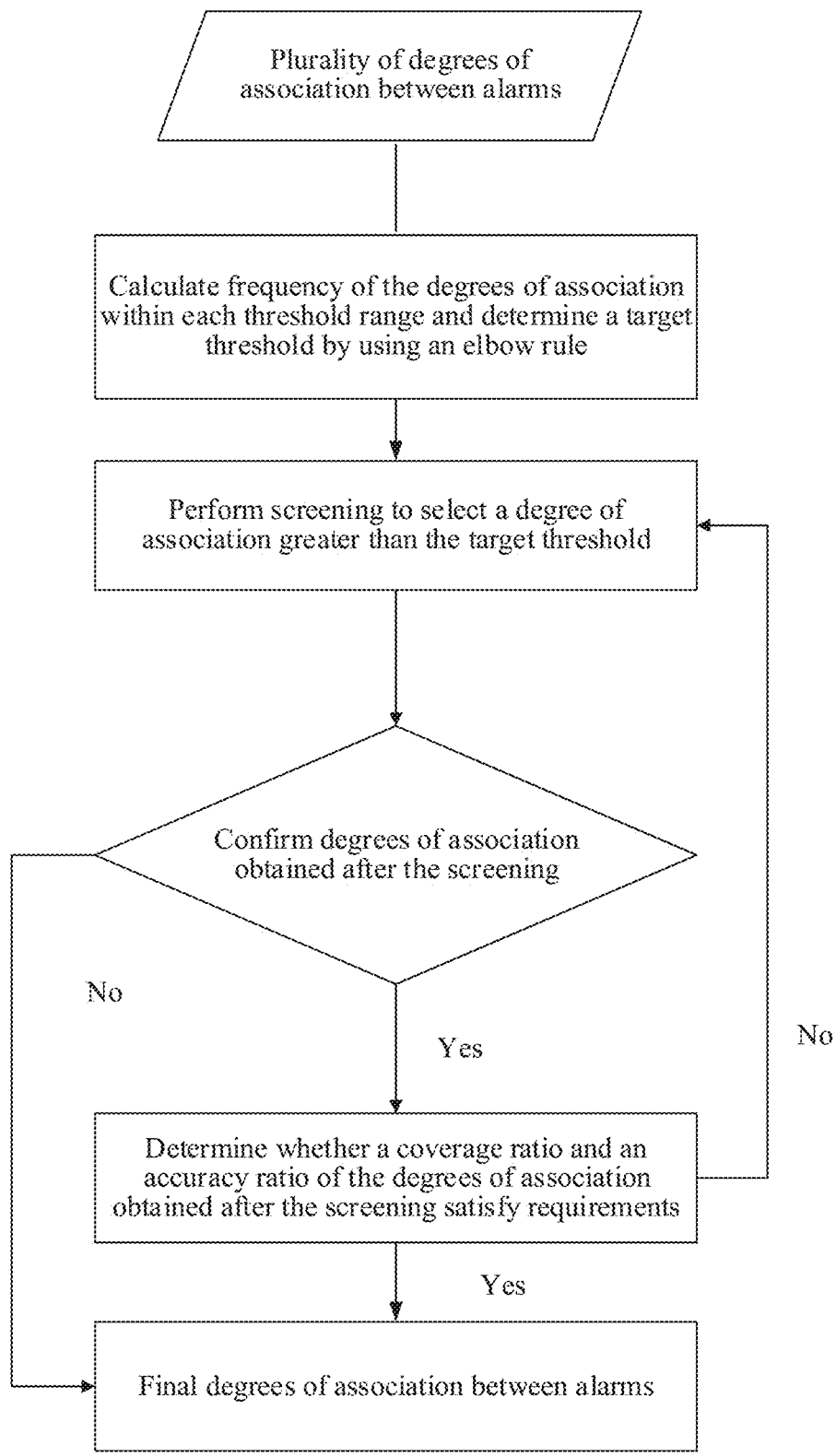
FIG. 14 is a schematic diagram of another embodiment of screening a plurality of degrees of association according to an embodiment of this application.

In this embodiment of this application, if the target threshold is determined by using the elbow rule, a process of screening degrees of association may be shown in FIG. 14. The process includes:

After a plurality of degrees of association between alarms are obtained, frequency of the degrees of association within each threshold range may be calculated, and then a target threshold is determined by using an elbow rule; and then, the plurality of degrees of association are screened by using the target threshold.

It may be understood that degrees of association obtained after the screening by using the target threshold may not satisfy requirements in terms of a coverage ratio and an accuracy ratio. Therefore, the process further includes:

determining whether to confirm the degrees of association obtained after the screening.

If the degrees of association obtained after the screening are confirmed, the confirmation process includes: determining whether the coverage ratio and the accuracy ratio of the degrees of association obtained after the screening satisfy the requirements, where if the coverage and the accuracy satisfy the requirements, final degrees of association between alarms are obtained; if the coverage and the accuracy do not satisfy the requirements, the degrees of association obtained after the screening may be manually adjusted, and then the adjusted degrees of association are again confirmed until the degrees of association obtained after the screening satisfy the requirements.

If the degrees of association obtained after the screening are not confirmed, the degrees of association obtained after the screening are directly used as final degrees of association between alarms.

In the foregoing process, the accuracy ratio refers to a ratio of correct degrees of association between alarms to all degrees of association between alarms in the degrees of association obtained after the screening, and the coverage ratio may be understood as a ratio of devices that can screen alarm records by using the degrees of association obtained after the screening to all devices in the target network.

The following uses a specific experiment result to reflect a better effect of the method provided in embodiments of this application.

Experiment 1: The applicant uses the method in embodiments of this application to generate degrees of association between alarms in a communication network, where the degrees of association include degrees of association between alarms in a cross-device situation and degrees of association between alarms in a single device. Details are shown in Table 2.

TABLE 2

| Distribution of degrees of association | Total quantity | Quantity of right degrees of association | Accuracy ratio |
|---|---|---|---|
| Cross-device | 171 | 157 | 91.8% |
| Single device | 128 | 112 | 87.5% |

As shown in Table 2, a quantity of the degrees of association between alarms in the cross-device situation is 171, and a quantity of the degrees of association between alarms in the single device is 128. The applicant verifies correctness of the foregoing two types of degrees of association between alarms. A quantity of correct degrees of association of the degrees of association between alarms in the cross-device situation is 157, and the accuracy ratio is 157/171=91.8%. A quantity of correct degrees of association of the degrees of association between alarms in the single device is 112, and the accuracy ratio is 112/128=87.5%.

It can be learned from the result of the experiment 1 that accuracy ratio of the degrees of association between alarms generated by using the method provided in this embodiment of this application is higher.

Experiment 2: The applicant uses the method in embodiments of this application to generate degrees of association between alarms in a communication network, and then screens alarm records in the communication network by using the generated degrees of association between alarms. A screening result is shown in Table 3 below.

TABLE 3

| Alarm compression process | Quantity of remaining alarm records |
|---|---|
| Original alarm records | 4481273 |
| Preprocessing | 992966 |
| Cross-domain compression | 874770 |
| Single-domain cross-device compression | 756316 |
| Single-domain single-device compression | 590307 |

As shown in Table 3, a quantity of the original alarm records is 4481273; the original alarm records are preprocessed in a process of constructing an alarm attribute graph, and a quantity of the remaining alarm records is 992966; then, cross-domain compression is performed on the alarm records by using degrees of association between alarms on different devices of different types, and in this case, a quantity of the remaining alarm records is 874770; then, single-domain cross-device compression is performed on the alarm records by using degrees of association between alarms on different devices of the same type, and in this case, a quantity of the remaining alarm records is 756316; and finally, single-domain single-device compression is performed on the alarm records by using degrees of association between alarms on a single device, and in this case, a quantity of the remaining alarm records is 590307.

It can be seen from the result of the experiment 2 that, the alarm records are compressed by using the degrees of association between alarms generated by using the method provided in this embodiment of this application, and a compression ratio is (1-590307/4481273)=88%. Therefore, an effect of compressing the alarm records by using the degrees of association between alarms generated by using the method provided in this embodiment of this application is better. Experiment 3: The applicant uses an existing method to generate degrees of association between alarms, and compresses alarm records in a communication network by using the generated degrees of association between alarms. In addition, the applicant uses the method in embodiments of this application to generate degrees of association between alarms in a communication network, and then compresses alarm records in the communication network by using the generated degrees of association between alarms. Compression results of the two methods are shown in Table 4.

TABLE 4

| Data distribution | Quantity of alarm records compressed using the existing method | Quantity of alarm records compressed using this application | Degree of lift |
|---|---|---|---|
| Cross-device | 65151 | 118196 | 87% |
| Single device | 39603 | 44548 | 12.5% |

It can be seen from Table 4 that, the quantity of alarm records compressed based on the degrees of association between cross-device alarms generated by using the existing method is 65151, and the quantity of alarm records compressed based on the degrees of association between cross-device alarms generated by using this application is 118196. Compared with the existing method, the degree of lift of this application is (118196−65151)/65151=87%. The quantity of alarm records compressed based on the degrees of association between single-device alarms generated by using the existing method is 39603, and the quantity of alarm records compressed based on the degrees of association between single-device alarms generated by using this application is 44548. Compared with the existing method, the degree of lift of this application is (44548−39603)/39603=87%.

It can be seen from the result of the experiment 3 that, an effect of compressing the alarm records by using the degrees of association between alarms generated by using the method provided in this embodiment of this application is better than an effect of compressing the alarm records by using the degrees of association between alarms generated by using the existing method.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

Figure 15:
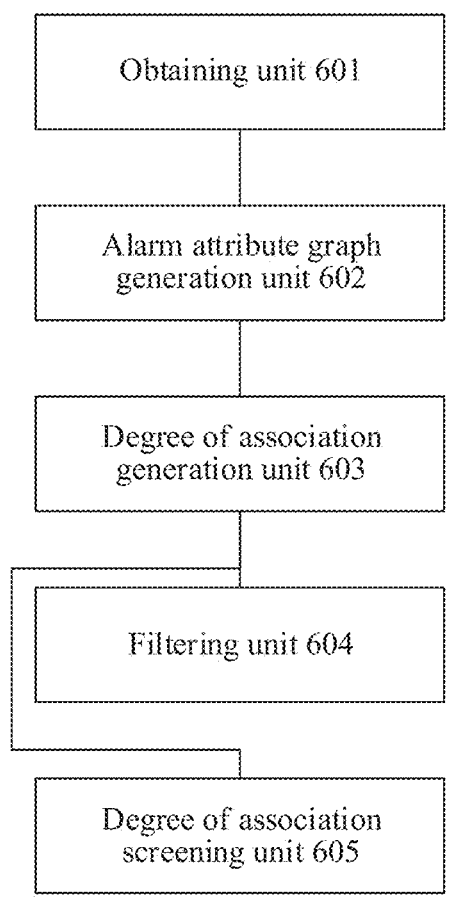
FIG. 15 is a schematic diagram of a structure of an alarm processing apparatus according to an embodiment of this application.

Refer to FIG. 15. An embodiment of this application provides an embodiment of an alarm processing apparatus. The alarm processing apparatus may be included in the network hub of the communication system shown in FIG. 1, and specifically includes: an obtaining unit 601, an alarm attribute graph generation unit 602, and a degree of association generation unit 603.

The obtaining unit 601 is configured to obtain a plurality of alarm records of a target network, where the target network includes a plurality of devices, and each alarm record includes an alarm name, an alarm occurrence time point, and an identifier of a device in which an alarm occurs.

The obtaining unit 601 is further configured to obtain topology data of the target network, where the topology data includes type information of the plurality of devices and a communication connection relationship between the plurality of devices.

The alarm attribute graph generation unit 602 is configured to generate an alarm attribute graph based on the plurality of alarm records and the topology data, where the alarm attribute graph includes identifiers of the plurality of devices, the communication connection relationship between the plurality of devices, the type information of the plurality of devices, and alarm attribute information of the plurality of devices, and the alarm attribute information of each device includes a name of an alarm occurring in the device and an occurrence time point of each alarm in the device.

The degree of association generation unit 603 is configured to obtain a degree of association between alarms based on the alarm attribute graph.

In an implementation, the alarm processing apparatus further includes: a filtering unit 604, configured to filter out redundant alarms based on the degree of association between the alarms.

In an implementation, the degree of association generation unit 603 is configured to: determine at least one group of devices based on the alarm attribute graph, where each group of devices in the at least one group of devices includes at least one device and satisfies a first target condition; and determine, based on the alarm attribute information of each device in the at least one group of devices, a degree of association between two alarms that occur in one group of devices satisfying the first target condition.

In an implementation, the first target condition includes: each group of devices includes one device and a type of the device in each group of devices is a first type.

In an implementation, the first target condition includes: each group of devices includes two devices, types of the two devices in each group of devices are both a first type, and the two devices in each group of devices are in communication connection; and the degree of association is a degree of association between an alarm that occurs in one device and an alarm that occurs in the other device in a group of devices satisfying the first target condition.

In an implementation, the first target condition includes: each group of devices includes two devices, types of the two devices in each group of devices are a first type and a second type respectively, and the two devices in each group of devices are in communication connection; and the degree of association is a degree of association between an alarm that occurs in a device of the first type and an alarm that occurs in a device of the second type in a group of devices satisfying the first target condition.

In an implementation, the degree of association generation unit 603 is configured to: determine, based on the alarm attribute information of each device in the at least one group of devices, a quantity of times that an alarm with a first name occurs, a quantity of times that an alarm with a second name occurs, and a quantity of times that the alarm with the first name and the alarm with the second name occur collaboratively in each group of devices, and determine that a collaborative occurrence rule is that a time point at which the alarm with the first name occurs and a time point at which the alarm with the second name occurs satisfy a second target condition; and determine, based on the quantity of times that the alarm with the first name occurs, the quantity of times that the alarm with the second name occurs, and the quantity of times that the alarm with the first name and the alarm with the second name occur collaboratively in each group of devices, a degree of association between the alarm with the first name and the alarm with the second name that occur in a group of devices satisfying the first target condition.

In an implementation, the second target condition includes: an absolute value of a difference between an occurrence time point of the alarm with the first name and an occurrence time point of the alarm with the second name is less than preset duration.

In an implementation, the degree of association generation unit 603 is configured to: determine, based on the quantity of times that the alarm with the first name occurs, the quantity of times that the alarm with the second name occurs, and the quantity of times that the alarm with the first name and the alarm with the second name occur collaboratively in each group of devices, a total quantity of times that the alarm with the first name occurs, a total quantity of times that the alarm with the second name occurs, and a total quantity of times that the alarm with the first name and the alarm with the second name occur collaboratively in the at least one group of devices; and determine, based on the total quantity of times that the alarm with the first name occurs, the total quantity of times that the alarm with the second name occurs, the total quantity of times that the alarm with the first name and the alarm with the second name occur collaboratively, and a target formula, a degree of association between the alarm with the first name and the alarm with the second name that occur in a group of devices satisfying the first target condition, where the degree of association indicates a possibility that the alarm with the first name causes the alarm with the second name or a possibility that the alarm with the second name causes the alarm with the first name; and the target formula is an asymmetric measurement formula.

In an implementation, the degree of association indicates the possibility that the alarm with the first name causes the alarm with the second name; and the target formula includes:

$$P_{A\,to\,B} = \frac{n_{AB}/n_A}{Y - n_{AB}/n_B},$$

where $P_{AtoB}$ represents the possibility that the alarm with the first name causes the alarm with the second name, Y is a constant greater than or equal to 2, $n_A$ represents the total quantity of times that the alarm with the first name occurs, $n_B$ represents the total quantity of times that the alarm with the second name occurs, and $n_{AB}$ represents the total quantity of times that the alarm with the first name and the alarm with the second name occur collaboratively.

In an implementation, the obtaining unit 601 is configured to obtain the topology data of the target network based on a device path log of the target network, where the device path log includes data of at least one communication path, the at least one communication path includes the plurality of devices, each communication path includes a plurality of devices in communication connection, and data of each communication path includes identifiers of the plurality of devices in the communication connection and type information of the plurality of devices in the communication connection.

In an implementation, there are a plurality of degrees of association between the alarms, and each degree of association indicates a possibility that an alarm with a name causes an alarm with another name; and the alarm processing apparatus further includes: a degree of association screening unit 605, configured to screen the plurality of degrees of association to select at least one degree of association that is greater than a target threshold.

In an implementation, the degree of association screening unit 605 is configured to: determine, based on the plurality of degrees of association between the alarms, a quantity of degrees of association that are within each of a plurality of threshold ranges; and determine the target threshold based on the quantity of degrees of association between alarms within each threshold range.

In an implementation, the obtaining unit 601 is configured to obtain a plurality of alarm records generated by the target network in a target time segment.

In an implementation, the target time segment is one month.

Figure 16:
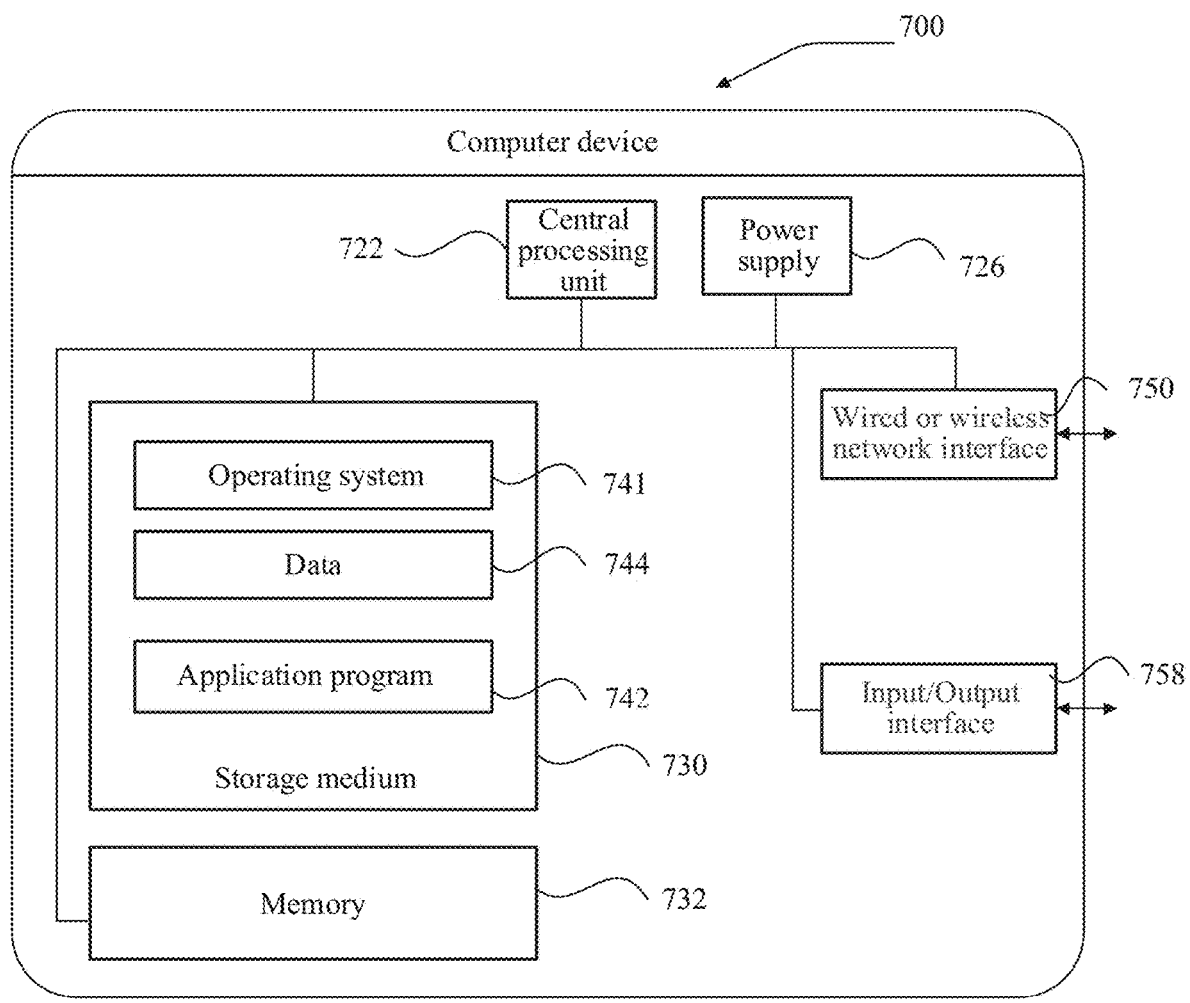
FIG. 16 is a schematic diagram of a structure of a computer device according to an embodiment of this application.

FIG. 16 is a schematic diagram of a structure of a computer device according to an embodiment of this application. The computer device 700 may vary greatly due to different configurations or performance, and may include one or more central processing units (central processing units, CPUs) 722 (for example, one or more processors), a memory 732, and one or more storage media 730 (for example, one or more mass storage devices) that store an application program 742 or data 744. The memory 732 and the storage medium 730 may implement temporary or persistent storage. The program stored in the storage medium 730 may include one or more modules (not shown in the figure), and each module may include a series of instruction operations for the computer device. Furthermore, the central processing unit 722 may be configured to communicate with the storage medium 730, and perform, on the computer device 700, the series of instruction operations in the storage medium 730.

The computer device 700 may further include one or more power supplies 726, one or more wired or wireless network interfaces 750, one or more input/output interfaces 758, and/or one or more operating systems 741, such as Windows Server™, Mac OS X™, Unix™, Linux™, and FreeBSD™.

The steps performed by the computer device in the foregoing embodiments may be based on the structure of the computer device shown in FIG. 16.

The CPU 722 is configured to perform the following steps:

obtaining a plurality of alarm records of a target network, where the target network includes a plurality of devices, and each alarm record includes an alarm name, an alarm occurrence time point, and an identifier of a device in which an alarm occurs;

obtaining topology data of the target network, where the topology data includes type information of the plurality of devices and a communication connection relationship between the plurality of devices;

generating an alarm attribute graph based on the plurality of alarm records and the topology data, where the alarm attribute graph includes identifiers of the plurality of devices, the communication connection relationship between the plurality of devices, the type information of the plurality of devices, and alarm attribute information of the plurality of devices, and the alarm attribute information of each device includes a name of an alarm occurring in the device and an occurrence time of an alarm of each name in the device; and obtaining a degree of association between alarms based on the alarm attribute graph.

In this embodiment, specific function module division of the processor 722 may be similar to the function module division manner described in FIG. 15, and details are not described herein again.

An embodiment of this application further provides a chip, including one or more processors. Some or all of the processors is configured to read and execute a computer program stored in a memory, to perform the methods in the embodiments corresponding to FIG. 2, FIG. 3, FIG. 6, FIG. 7, FIG. 8, FIG. 9, FIG. 11, FIG. 12, and FIG. 14.

Optionally, the chip includes the memory, and the memory and the processor are connected to the memory by using a circuit or a wire. Further optionally, the chip further includes a communication interface, and the processor is connected to the communication interface. The communication interface is configured to receive data and/or information that needs to be processed. The processor obtains the data and/or information from the communication interface, processes the data and/or information, and outputs a processing result through the communication interface. The communication interface may be an input/output interface.

In some implementations, some of the one or more processors may implement some steps in the foregoing method by using dedicated hardware. For example, processing related to a neural network model may be implemented by a dedicated neural network processor or graphics processing unit.

The method provided in embodiments of this application may be implemented by one chip, or may be collaboratively implemented by a plurality of chips.

An embodiment of this application further provides a computer storage medium. The computer storage medium is configured to store computer software instructions used by the foregoing computer device, and the computer software instructions include a program designed for execution by the computer device.

The computer device may be the alarm processing apparatus described in FIG. 15.

An embodiment of this application further provides a computer program product. The computer program product includes computer software instructions, and the computer software instructions may be loaded by a processor to implement the procedures in the methods shown in FIG. 2, FIG. 3, FIG. 6, FIG. 7, FIG. 8, FIG. 9, FIG. 11, FIG. 12, and FIG. 14.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be in one location, or may be distributed on a plurality of network units. Some or all of the units may be selected based on actual requirements to achieve the objectives of the solutions of embodiments.

In addition, functional units in embodiments of this application may be integrated into one processing unit, each of the units may exist independently physically, or two or more units may be integrated into one unit. The integrated unit may be implemented in a form of hardware, or may be implemented in a form of a software function unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this application. The storage medium includes any medium that can store program code, such as a USB flash drive, a removable hard disk, a read-only memory (ROM, Read-Only Memory), a random access memory (RAM, Random Access Memory), a magnetic disk, or an optical disc.

What is claimed is:

1. An alarm processing method, comprising:
obtaining a plurality of alarm records of a target network, wherein the target network comprises a plurality of devices, and each alarm record comprises an alarm name, an alarm occurrence time point, and an identifier of a device in which an alarm occurs;
obtaining topology data of the target network, wherein the topology data comprises type information of the plurality of devices and a communication connection relationship between the plurality of devices;
generating an alarm attribute graph based on the plurality of alarm records and the topology data, wherein the alarm attribute graph comprises identifiers of the plurality of devices, the communication connection relationship between the plurality of devices, the type information of the plurality of devices, and alarm attribute information of the plurality of devices, and wherein the alarm attribute information of each device comprises a name of an alarm occurring in the device and an occurrence time point of each alarm in the device; and
obtaining a degree of association between alarms based on the alarm attribute graph, wherein the obtaining a degree of association between alarms based on the alarm attribute graph comprises:
determining at least one group of devices based on the alarm attribute graph, wherein each group of devices in the at least one group of devices comprises at least one device and satisfies a first target condition; and
determining, based on the alarm attribute information of each device in the at least one group of devices, a degree of association between two alarms that occur in one group of devices satisfying the first target condition.

2. The alarm processing method according to claim 1, further comprising:
filtering out redundant alarms based on the degree of association between the alarms.

3. The alarm processing method according to claim 1, wherein the first target condition comprises:
each group of devices comprises one device and a type of the device in each group of devices is a first type.

4. The alarm processing method according to claim 1, wherein the first target condition comprises: each group of devices comprises two devices, types of the two devices in each group of devices are both a first type, and the two devices in each group of devices are in communication connection; and
the degree of association is a degree of association between an alarm that occurs in one device and an alarm that occurs in the other device in a group of devices satisfying the first target condition.

5. The alarm processing method according to claim 1, wherein the first target condition comprises:
   each group of devices comprises two devices, types of the two devices in each group of devices are a first type and a second type respectively, and the two devices in each group of devices are in communication connection; and
   the degree of association is a degree of association between an alarm that occurs in a device of the first type and an alarm that occurs in a device of the second type in a group of devices satisfying the first target condition.

6. The alarm processing method according to claim 1, wherein the determining, based on the alarm attribute information of each device in the at least one group of devices, a degree of association between two alarms that occur in one group of devices satisfying the first target condition comprises:
   determining, based on the alarm attribute information of each device in the at least one group of devices, a quantity of times that an alarm with a first name occurs, a quantity of times that an alarm with a second name occurs, and a quantity of times that the alarm with the first name and the alarm with the second name occur collaboratively in each group of devices, and determining that a collaborative occurrence rule is that a time point at which the alarm with the first name occurs and a time point at which the alarm with the second name occurs satisfy a second target condition; and
   determining, based on the quantity of times that the alarm with the first name occurs, the quantity of times that the alarm with the second name occurs, and the quantity of times that the alarm with the first name and the alarm with the second name occur collaboratively in each group of devices, a degree of association between the alarm with the first name and the alarm with the second name that occur in a group of devices satisfying the first target condition.

7. The alarm processing method according to claim 6, wherein the second target condition comprises:
   an absolute value of a difference between an occurrence time point of the alarm with the first name and an occurrence time point of the alarm with the second name is less than preset duration.

8. The alarm processing method according to claim 6, wherein the determining, based on the quantity of times that the alarm with the first name occurs, the quantity of times that the alarm with the second name occurs, and the quantity of times that the alarm with the first name and the alarm with the second name occur collaboratively in each group of devices, a degree of association between the alarm with the first name and the alarm with the second name that occur in a group of devices satisfying the first target condition comprises:
   determining, based on the quantity of times that the alarm with the first name occurs, the quantity of times that the alarm with the second name occurs, and the quantity of times that the alarm with the first name and the alarm with the second name occur collaboratively in each group of devices, a total quantity of times that the alarm with the first name occurs, a total quantity of times that the alarm with the second name occurs, and a total quantity of times that the alarm with the first name and the alarm with the second name occur collaboratively in the at least one group of devices; and
   determining, based on the total quantity of times that the alarm with the first name occurs, the total quantity of times that the alarm with the second name occurs, the total quantity of times that the alarm with the first name and the alarm with the second name occur collaboratively, and a target formula, a degree of association between the alarm with the first name and the alarm with the second name that occur in a group of devices satisfying the first target condition, wherein the degree of association indicates a possibility that the alarm with the first name causes the alarm with the second name or a possibility that the alarm with the second name causes the alarm with the first name; and
   the target formula is an asymmetric measurement formula.

9. The alarm processing method according to claim 8, wherein the degree of association indicates the possibility that the alarm with the first name causes the alarm with the second name; and
   the target formula comprises:

$$P_{A\,to\,B} = \frac{n_{AB}/n_A}{Y - n_{AB}/n_B},$$

wherein $P_{AtoB}$ represents the possibility that the alarm with the first name causes the alarm with the second name, Y is a constant greater than or equal to 2, $n_A$ represents the total quantity of times that the alarm with the first name occurs, $n_B$ represents the total quantity of times that the alarm with the second name occurs, and $N_{A\,B}$ represents the total quantity of times that the alarm with the first name and the alarm with the second name occur collaboratively.

10. The alarm processing method according to claim 1, wherein the obtaining topology data of the target network comprises:
    obtaining the topology data of the target network based on a device path log of the target network, wherein the device path log comprises data of at least one communication path, the at least one communication path comprises the plurality of devices, each communication path comprises a plurality of devices in communication connection, and data of each communication path comprises identifiers of the plurality of devices in the communication connection and type information of the plurality of devices in the communication connection.

11. The alarm processing method according to claim 1, wherein there are a plurality of degrees of association between the alarms, and each degree of association indicates a possibility that an alarm with a name causes an alarm with another name; and
    after the obtaining a degree of association between alarms based on the alarm attribute graph, the method further comprises:
    screening the plurality of degrees of association to select at least one degree of association that is greater than a target threshold.

12. The alarm processing method according to claim 11, wherein after the obtaining a degree of association between alarms based on the alarm attribute graph, and before the screening the plurality of degrees of association to select at least one degree of association whose possibility is greater than a threshold, the method further comprises:

determining, based on the plurality of degrees of association between the alarms, a quantity of degrees of association that are within each of a plurality of threshold ranges; and determining the target threshold based on the quantity of degrees of association between alarms within each threshold range.

13. The alarm processing method according to claim 1, wherein the obtaining a plurality of alarm records of a target network comprises:

obtaining a plurality of alarm records generated by the target network in a target time segment.

14. An alarm processing apparatus, comprising:
one or more processors; and
one or more non-transitory computer readable media storing a program to be executed by the one or more processors, wherein the program comprises instructions that when executed by the one or more processors, cause the alarm processing apparatus to perform operations comprising:
obtaining a plurality of alarm records of a target network, wherein the target network comprises a plurality of devices, and each alarm record comprises an alarm name, an alarm occurrence time point, and an identifier of a device in which an alarm occurs;
obtaining topology data of the target network, wherein the topology data comprises type information of the plurality of devices and a communication connection relationship between the plurality of devices;
generating an alarm attribute graph based on the plurality of alarm records and the topology data, wherein the alarm attribute graph comprises identifiers of the plurality of devices, the communication connection relationship between the plurality of devices, the type information of the plurality of devices, and alarm attribute information of the plurality of devices, and wherein the alarm attribute information of each device comprises a name of an alarm occurring in the device and an occurrence time point of each alarm in the device; and
obtaining a degree of association between alarms based on the alarm attribute graph, wherein the obtaining a degree of association between alarms based on the alarm attribute graph comprises:
determining at least one group of devices based on the alarm attribute graph, wherein each group of devices in the at least one group of devices comprises at least one device and satisfies a first target condition; and
determining, based on the alarm attribute information of each device in the at least one group of devices, a degree of association between two alarms that occur in one group of devices satisfying the first target condition.

15. The alarm processing apparatus according to claim 14, wherein the operations further comprise filtering out redundant alarms based on the degree of association between the alarms.

16. The alarm processing apparatus according to claim 14, wherein the first target condition comprises:
each group of devices comprises one device and a type of the device in each group of devices is a first type.

17. The alarm processing apparatus according to claim 14, wherein the first target condition comprises: each group of devices comprises two devices, types of the two devices in each group of devices are both a first type, and the two devices in each group of devices are in communication connection; and the degree of association is a degree of association between an alarm that occurs in one device and an alarm that occurs in the other device in a group of devices satisfying the first target condition.

18. The alarm processing apparatus according to claim 14, wherein the first target condition comprises:
each group of devices comprises two devices, types of the two devices in each group of devices are a first type and a second type respectively, and the two devices in each group of devices are in communication connection; and
the degree of association is a degree of association between an alarm that occurs in a device of the first type and an alarm that occurs in a device of the second type in a group of devices satisfying the first target condition.

19. The alarm processing apparatus according to claim 14, wherein the determining, based on the alarm attribute information of each device in the at least one group of devices, a degree of association between two alarms that occur in one group of devices satisfying the first target condition comprises:
determining, based on the alarm attribute information of each device in the at least one group of devices, a quantity of times that an alarm with a first name occurs, a quantity of times that an alarm with a second name occurs, and a quantity of times that the alarm with the first name and the alarm with the second name occur collaboratively in each group of devices, and determining that a collaborative occurrence rule is that a time point at which the alarm with the first name occurs and a time point at which the alarm with the second name occurs satisfy a second target condition; and
determining, based on the quantity of times that the alarm with the first name occurs, the quantity of times that the alarm with the second name occurs, and the quantity of times that the alarm with the first name and the alarm with the second name occur collaboratively in each group of devices, a degree of association between the alarm with the first name and the alarm with the second name that occur in a group of devices satisfying the first target condition.

20. The alarm processing apparatus according to claim 19, wherein the second target condition comprises:
an absolute value of a difference between an occurrence time point of the alarm with the first name and an occurrence time point of the alarm with the second name is less than preset duration.

21. The alarm processing apparatus according to claim 19, wherein the determining, based on the quantity of times that the alarm with the first name occurs, the quantity of times that the alarm with the second name occurs, and the quantity of times that the alarm with the first name and the alarm with the second name occur collaboratively in each group of devices, a degree of association between the alarm with the first name and the alarm with the second name that occur in a group of devices satisfying the first target condition comprises:
determining, based on the quantity of times that the alarm with the first name occurs, the quantity of times that the alarm with the second name occurs, and the quantity of times that the alarm with the first name and the alarm with the second name occur collaboratively in each group of devices, a total quantity of times that the alarm with the first name occurs, a total quantity of times that the alarm with the second name occurs, and a total quantity of times that the alarm with the first name and the alarm with the second name occur collaboratively in the at least one group of devices; and determining, based on the total quantity of times that the alarm with the first name occurs, the total quantity of times that the alarm with the second name occurs, the total quantity of times that the alarm with the first name and the alarm with the second name occur collaboratively, and a target formula, a degree of association between the alarm with the first name and the alarm with the second name that occur in a group of devices satisfying the first target condition, wherein the degree of association indicates a possibility that the alarm with the first name causes the alarm with the second name or a possibility that the alarm with the second name causes the alarm with the first name; and the target formula is an asymmetric measurement formula.

22. The alarm processing apparatus according to claim 21, wherein the degree of association indicates the possibility that the alarm with the first name causes the alarm with the second name; and the target formula comprises:

$$P_{A\,to\,B} = \frac{n_{AB}/n_A}{Y - n_{AB}/n_B},$$

wherein $P_{AtoB}$ represents the possibility that the alarm with the first name causes the alarm with the second name, Y is a constant greater than or equal to 2, $n_A$ represents the total quantity of times that the alarm with the first name occurs, $n_B$ represents the total quantity of times that the alarm with the second name occurs, and $n_{A\,B}$ represents the total quantity of times that the alarm with the first name and the alarm with the second name occur collaboratively.

23. The alarm processing apparatus according to claim 14, wherein the obtaining topology data of the target network comprises:

obtaining topology data of the target network based on a device path log of the target network, wherein the device path log comprises data of at least one communication path, the at least one communication path comprises the plurality of devices, each communication path comprises a plurality of devices in communication connection, and data of each communication path comprises identifiers of the plurality of devices in the communication connection and type information of the plurality of devices in the communication connection.

24. The alarm processing apparatus according to claim 14, wherein there are a plurality of degrees of association between the alarms, and each degree of association indicates a possibility that an alarm with a name causes an alarm with another name; and after the obtaining a degree of association between alarms based on the alarm attribute graph, the operations further comprise:

screening the plurality of degrees of association to select at least one degree of association that is greater than a target threshold.

25. The alarm processing apparatus according to claim 24, wherein after the obtaining a degree of association between alarms based on the alarm attribute graph, and before the screening the plurality of degrees of association to select at least one degree of association whose possibility is greater than a threshold, the operations further comprise:

determining, based on the plurality of degrees of association between the alarms, a quantity of degrees of association that are within each of a plurality of threshold ranges; and determining the target threshold based on the quantity of degrees of association between alarms within each threshold range.

26. The alarm processing apparatus according to claim 14, wherein the obtaining a plurality of alarm records of a target network comprises:

obtaining a plurality of alarm records generated by the target network in a target time segment.

* * * * *

UNITED STATES PATENT AND TRADEMARK OFFICE
CERTIFICATE OF CORRECTION

PATENT NO. : 12,301,405 B2
APPLICATION NO. : 18/334090
DATED : May 13, 2025
INVENTOR(S) : Min Zhou et al.

Page 1 of 1

It is certified that error appears in the above-identified patent and that said Letters Patent is hereby corrected as shown below:

In the Claims

In Column 38, In Line 34, In Claim 9, delete "$N_{A\ B}$" and insert -- $n_{AB}$ --.

In Column 41, In Line 35, In Claim 22, delete "$n_{A\ B}$" and insert -- $n_{AB}$ --.

Signed and Sealed this
Sixteenth Day of September, 2025

Coke Morgan Stewart
*Acting Director of the United States Patent and Trademark Office*